United States Patent [19]

Becker

[11] Patent Number: 5,078,227

[45] Date of Patent: Jan. 7, 1992

[54] AUXILIARY DRIVE FOR VEHICLES

[75] Inventor: Arie Becker, Emek Hayarden, Israel

[73] Assignee: S. A. E. Akikim, Emek Hayarden, Israel

[21] Appl. No.: 536,178

[22] Filed: Jun. 11, 1990

[30] Foreign Application Priority Data

Jun. 18, 1989 [IL] Israel .................................. 90644
Oct. 22, 1989 [IL] Israel .................................. 92074

[51] Int. Cl.⁵ .................... B62D 61/02; B62M 1/10
[52] U.S. Cl. ................................ 180/221; 180/220; 180/907; 280/212
[58] Field of Search .......................... 180/220-222, 180/216, 342, 343, 65.2, 65.6, 65.8, 907; 280/304.1, 250.1, 214; 318/375

[56] References Cited

U.S. PATENT DOCUMENTS

| 633,484 | 9/1899 | Pond . | |
|---|---|---|---|
| 1,158,311 | 2/1915 | Schunk . | |
| 1,191,287 | 10/1915 | Vaux . | |
| 1,259,989 | 1/1918 | Hult . | |
| 1,424,581 | 1/1921 | Mepstead . | |
| 2,031,881 | 12/1933 | Evinrude . | |
| 2,069,679 | 9/1934 | Petmecky . | |
| 2,501,866 | 3/1946 | Gilardi . | |
| 3,339,659 | 10/1965 | Wolf . | |
| 3,431,994 | 6/1967 | Wood . | |
| 3,793,578 | 2/1974 | Rettig | 318/375 |
| 3,841,428 | 10/1974 | Bialek | 180/220 |
| 3,891,044 | 10/1974 | Tiede | 180/222 |
| 3,915,250 | 3/1974 | Laden . | |
| 3,921,745 | 11/1975 | McCulloch et al. | 180/220 |
| 4,039,914 | 8/1977 | Steigerwald | 318/375 |
| 4,044,852 | 8/1977 | Lewis et al. | 180/220 |
| 4,104,571 | 8/1978 | Gurwicz | 318/375 |
| 4,111,274 | 9/1978 | King et al. | 180/25 R |
| 4,143,730 | 4/1978 | Desmond . | |
| 4,175,629 | 11/1979 | Kalajzich | 180/220 |
| 4,422,515 | 12/1983 | Loveless | 180/6.5 |
| 4,633,962 | 1/1987 | Cox | 180/65.1 |
| 4,641,720 | 2/1987 | Young | 180/6.24 |
| 4,671,524 | 6/1987 | Haubenwallner | 280/304.1 |
| 4,798,255 | 1/1989 | Wu | 180/65.1 |
| 4,805,712 | 2/1989 | Singleton | 180/65.1 |
| 4,962,942 | 10/1990 | Barrett et al. | 280/250.1 |

FOREIGN PATENT DOCUMENTS 1047663 12/1953 France .
1122949 8/1968 United Kingdom .
2134056 8/1984 United Kingdom .

Primary Examiner—Richard A. Bertsch
Assistant Examiner—Paul Dickson
Attorney, Agent, or Firm—Ladas & Parry

[57] ABSTRACT

An electrically driven auxiliary drive for vehicles including first and second electric motors each having associated therewith a friction drive element and apparatus for selectably bringing the friction drive elements into operative driving engagement with the tire of a vehicle wheel for driving thereof the friction drive elements being maintained in fixed mutually spaced relationship.

38 Claims, 25 Drawing Sheets

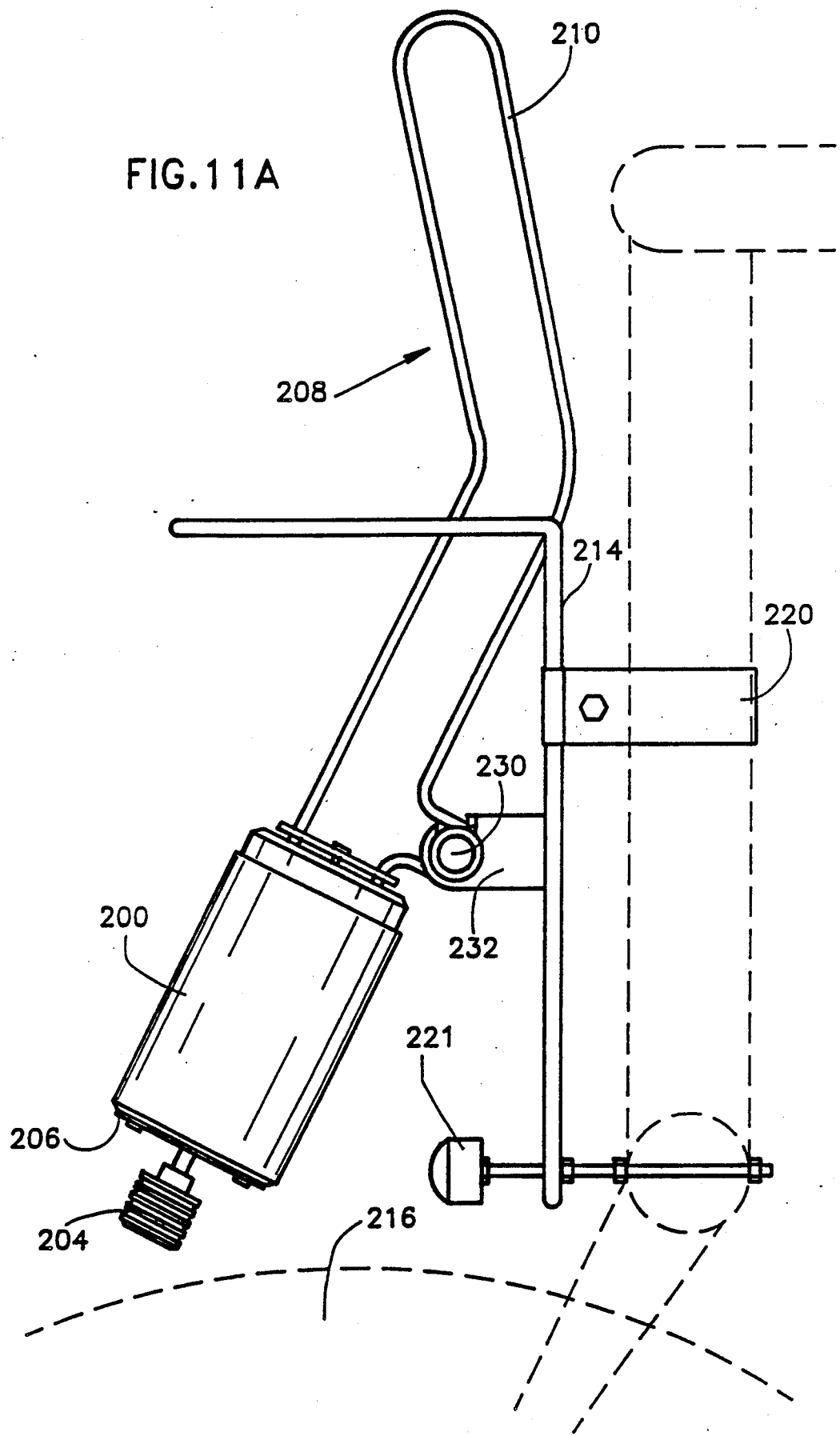

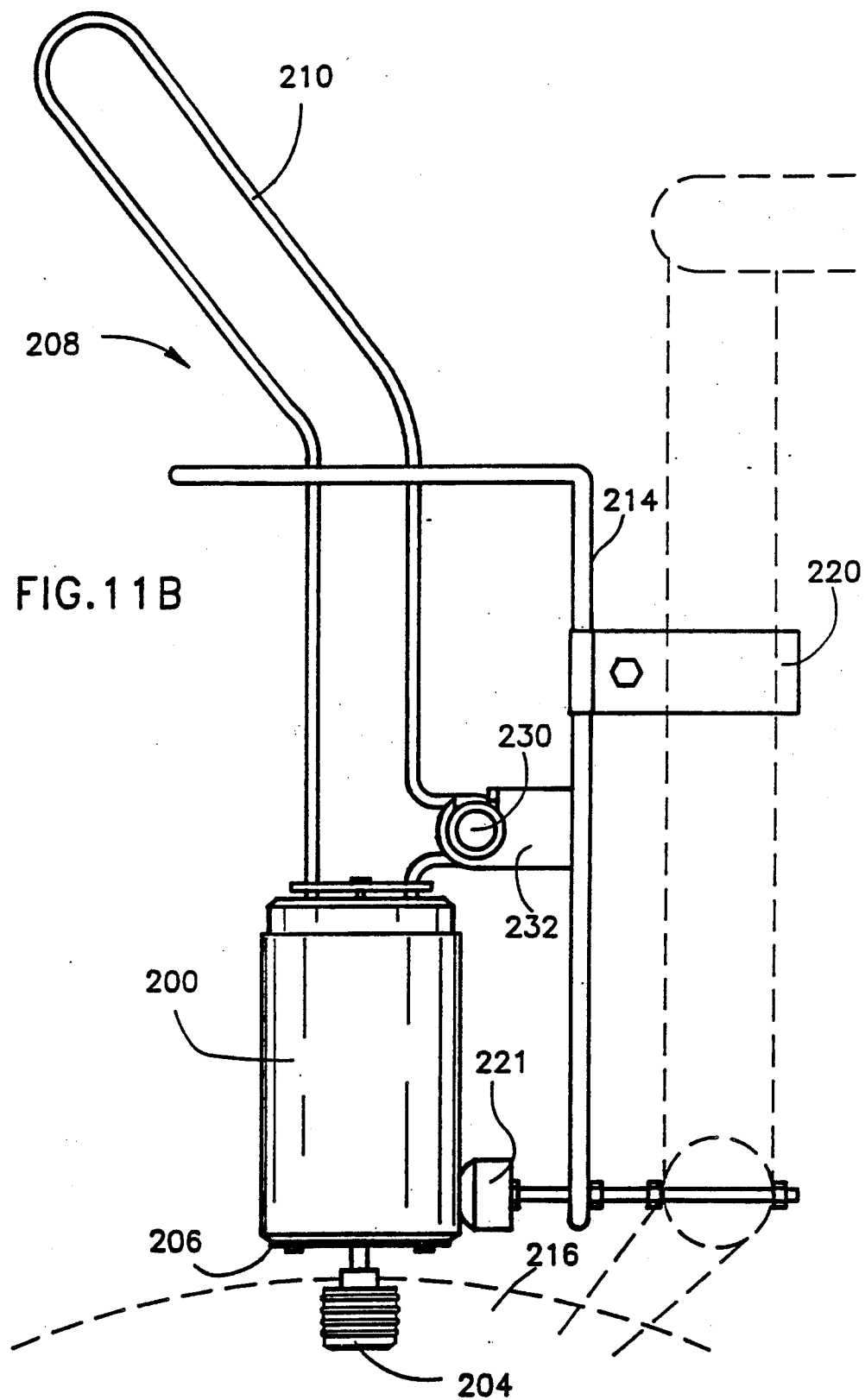

AUXILIARY DRIVE FOR VEHICLES

FIELD OF THE INVENTION

The present invention relates to electrically driven vehicles and more particularly to retrofittable electrically driven auxiliary drives for vehicles which are normally manually propelled.

BACKGROUND OF THE INVENTION

Various types of auxiliary drives for vehicles such as bicycles are known in the patent literature. Representative of the art are the following patents:

U.S. Pat. No. 1,259,989 describes a gasoline engine driven auxiliary drive which includes two driven rollers which engage opposite sides of the rim of the back wheel of a bicycle.

U.S. Pat. No. 2,031,881 describes a motor bicycle including a gasoline engine driven roller which engages the outer surface of the back tire of the bicycle.

U.S. Pat. No. 2,069,679 describes a gasoline engine driven auxiliary drive which includes a geared member which engages a suitably configured tooth containing tire tread of a bicycle.

U.S. Pat. No. 3,339,659 describes a powered friction-driving device for vehicles including a pair of frusto-conical rollers which simultaneously engage the vehicle wheel. Speed shifting apparatus is provided for altering the point or line of engagement of the drive members with the tire such that the speed of the wheel may be changed for a given speed of rotation of the drive members.

U.S. Pat. No. 3,891,044 provides a cone shaped electric motor driven friction drive which engages an auxiliary rim associated with the front wheel of a bicycle.

U.S. Pat. No. 3,915,250 describes an auxiliary drive for a bicycle employing a pair of rollers which pinch the back time of a bicycle therebetween.

U.S. Pat. No. 4,143,730 describes an electric motor driven friction drive which engages the outer surface of the back tire of a bicycle.

SUMMARY OF THE INVENTION

The present invention seeks to provide an electrically driven auxiliary drive for vehicles such as bicycles and wheelchairs, which is relatively light, inexpensive and convenient to use.

There is thus provided in accordance with a preferred embodiment of the present invention an electrically driven auxiliary drive for vehicles including first and second electric motors each having associated therewith a friction drive element and apparatus for selectably bringing the friction drive elements into operative driving engagement with both the rim and the tire of a vehicle wheel for driving thereof.

Additionally in accordance with an embodiment of the invention there is provided an auxiliary drive for vehicles including first and second electric motors each having associated therewith a friction drive element, apparatus for selectably bringing the friction drive elements into operative driving engagement with a vehicle wheel for driving thereof and motor control apparatus for operating the electric motors including apparatus preventing motor operation when the friction drive elements are not in operative driving engagement with the vehicle wheel.

Additionally in accordance with an embodiment of the invention there is provided an auxiliary drive for vehicles including first and second electric motors each having associated therewith a friction drive element, apparatus for mounting the first and second electric motors about a single pivot point, and apparatus for selectably pivoting the first and second electric motors about the single pivot point, thus selectively bringing the friction drive elements into operative driving engagement with a vehicle wheel for driving thereof, whereby due to the pivot mounting of the first and second motors, the first and second motors can maintain driving engagement with the vehicle wheel notwithstanding eccentricities thereof.

Further in accordance with a preferred embodiment of the invention there is provided an electrically driven auxiliary drive and regenerative braking system for vehicles including first and second electric motors each having associated therewith a friction drive element, apparatus for selectably bringing the friction drive elements into operative driving engagement with a vehicle wheel for driving thereof in a driving mode of operation, and for being driven thereby in a regenerative braking mode of operation and electrical energy storage apparatus for supplying electrical power to the first and second electric motors during operation in the driving mode and for receiving electrical power from the first and second electric motors during operation in the regenerative braking mode of operation.

In accordance with a preferred embodiment of the invention, the electrically driven auxiliary drive and regenerative braking system for vehicles includes electrical switching apparatus for preventing overturning due to excessive braking.

Further in accordance with a preferred embodiment of the invention, there is provided an electrically driven auxiliary drive for vehicles including first and second electric motors each having associated therewith a friction drive element, apparatus for selectably bringing the friction drive elements into operative driving engagement with a vehicle wheel for driving thereof and electrical energy storage apparatus for supplying electrical power to the first and second electric motors, wherein the electrical energy storage apparatus is readily removed from the auxiliary drive for recharging at a remote location.

Further in accordance with a preferred embodiment of the invention, the electrical energy storage apparatus is integrally formed with apparatus for permitting recharging thereof from mains power.

Additionally in accordance with a preferred embodiment of the invention the first and second electric motors are pivotably mounted onto a bicycle frame adjacent the front wheel so as to selectably assume either a wheel engagement orientation or a disengaged orientation and there is provided a spring loaded lever for determining the orientation of the first and second electric motors. The spring loaded lever is operative to normally maintain the first and second electric motors in a disengaged orientation, except when a predetermined force is applied to the lever.

Further in accordance with a preferred embodiment of the invention the first and second electric motors are pivotably mounted onto a bicycle frame adjacent the front wheel so as to selectably assume either a wheel engagement orientation or a disengaged orientation and there is provided a manually operated lever for determining the orientation of the first and second electric motors. The manually operated lever is operative to normally maintain the first and second electric motors in a disengaged orientation, except when a predetermined force is applied to the lever.

Additionally in accordance with an embodiment of the invention, the electrical energy storage apparatus is removably mounted on a base formed with electrical contacts arranged for immediate quick contact with corresponding contacts on the electrical energy storage apparatus when the electrical energy storage apparatus is positioned thereon.

According to an alternative embodiment of the present invention, the electrically driven auxiliary drive may be operatively associated with at least one and preferably two wheels of a wheelchair.

Further in accordance with an embodiment of the invention there is provided selectably operable dynamic braking apparatus which operates by short circuiting the terminals of each of the first and second motors. In order to prevent excessive braking which could cause overturning or excessive equipment wear, preferably the dynamic braking apparatus operates to short circuit the terminals in a pulsed mode. The dynamic braking apparatus may be associated with any of the embodiments of the present invention.

Additionally in accordance with a preferred embodiment of the present invention, the apparatus for selectively bringing the friction drive elements into operative driving engagement with a vehicle wheel includes apparatus for maintaining a predetermined pressure engagement between the friction drive elements and the vehicle wheel.

Further in accordance with a preferred embodiment of the invention, a front light and turn signals may be associated with the electrical energy storage apparatus and mounted thereon. Hazard warning light operation may be provided. A DC electrical socket may be provided for operation of auxiliary equipment, such as audio equipment.

There is also provided in accordance with a preferred embodiment of the present invention an electrically driven auxiliary drive for vehicles including first and second wheel engagement elements, at least one of which having associated therewith an electric motor and apparatus for selectably bringing the wheel engagement elements into operative driving engagement with both the rim and the tire of a vehicle wheel for driving thereof.

Additionally in accordance with an embodiment of the invention there is provided an auxiliary drive for vehicles including first and second wheel engagement elements, at least one of which having associated therewith an electric motor; apparatus for selectably bringing the wheel engagement elements into operative driving engagement with a vehicle wheel for driving thereof and motor control apparatus for operating the electric motor including apparatus preventing motor operation when the wheel engagement elements are not in operative driving engagement with the vehicle wheel.

Further in accordance with an embodiment of the present invention there is provided an auxiliary drive for vehicles including first and second wheel engagement elements, at least one of which having associated therewith an electric motor; apparatus for mounting the first and second wheel engagement elements about a single pivot point; and apparatus for selectably pivoting the first and second wheel engagement elements about the single pivot point, thus selectively bringing the wheel engagement elements into operative driving engagement with a vehicle wheel for driving thereof, whereby due to the pivot mounting of the first and second wheel engagement elements, the first and second wheel engagement elements can maintain driving engagement with the vehicle wheel notwithstanding eccentricities thereof.

Additionally in accordance with a preferred embodiment of the present invention there is provided an electrically driven auxiliary drive and regenerative braking system for vehicles including first and second wheel engagement elements, at least one of which having associated therewith an electric motor; apparatus for selectably bringing the wheel engagement elements into operative driving engagement with a vehicle wheel for driving thereof in a driving mode of operation, and for being driven thereby in a regenerative braking mode of operation; and electrical energy storage means for supplying electrical power to the electric motor during operation in the driving mode and for receiving electrical power from the first and second electric motors during operation in the regenerative braking mode of operation.

There is also provided electrical switching means for preventing overturning due to excessive braking.

Further in accordance with a preferred embodiment of the present invention there is provided an electrically driven auxiliary drive for vehicles including first and second wheel engagement elements, at least one of which having associated therewith an electric motor; apparatus for selectably bringing the wheel engagement elements into operative driving engagement with a vehicle wheel for driving thereof; and electrical energy storage apparatus for supplying electrical power to the electric motor, wherein the electrical energy storage apparatus is readily removed from the auxiliary drive for recharging at a remote location.

In accordance with a preferred embodiment of the invention, the electrical energy storage means is integrally formed with apparatus for permitting recharging thereof from mains power.

Further in accordance with an embodiment of the invention the first and second wheel engagement elements are pivotably mounted so as to selectably assume either a wheel engagement orientation or a disengaged orientation and wherein the apparatus for selectively bringing comprises a spring loaded lever for determining the orientation of the first and second wheel engagement elements, the spring loaded lever being operative to normally maintain the first and second wheel engagement elements in a disengaged orientation, except when a predetermined force is applied to the lever.

Additionally in accordance with a preferred embodiment of the invention, the first and second wheel engagement elements are pivotably mounted so as to selectably assume either a wheel engagement orientation or a disengaged orientation and wherein said means for selectively bringing comprises a manually operated lever for determining the orientation of the first and second wheel engagement elements, the manually operated lever being operative to normally maintain the first and second wheel engagement elements in a disengaged orientation, except when a predetermined force is applied to the lever.

Further in accordance with a preferred embodiment of the invention, the first and second electric motors are pivotably mounted so as to selectably assume either a wheel engagement orientation or a disengaged orientation and wherein the means for selectively bringing comprises a motor operated lever for determining the orientation of the first and second wheel engagement elements, the motor operated lever being operative to normally maintain the first and second wheel engagement elements in a disengaged orientation, except when a predetermined force is applied to the lever.

The invention is suitable for use with any suitable vehicle such as a bicycle or a wheelchair. In accordance with a preferred embodiment of the invention, the auxiliary drive apparatus may be associated with only one of the two rear wheels of a wheelchair.

In accordance with a preferred embodiment of the invention apparatus is provided for manually rotating only one of the front wheels of the wheelchair, thereby to effect steering of the wheelchair. The apparatus for manually rotating preferably is associated with a front wheel of the wheel chair located forward of the rear wheel of the wheelchair with which the auxiliary drive means are associated. Apparatus for governing the drive speed of the wheelchair may be mounted on the means for manually rotating.

In accordance with a preferred embodiment of the present invention, the apparatus for selectably bringing comprises apparatus for pivotably mounting the first and second electric motors and friction drive elements, handle means fixedly mounted for pivotal movement with said first and second electric motors and friction drive elements and selectable handle retaining means for selectably retaining said handle in one of two selectable orientations, an operating orientation wherein said friction drive elements are in driving engagement with a vehicle wheel and a non-driving orientation wherein the friction drive elements are out of drive engagement with the vehicle wheel.

In the foregoing embodiment, the spacing between the friction drive elements is preferably fixed, subject to adjustment to match a given wheel size. Engagement of the friction drive elements with the wheel is preferably achieved by rolling of the friction drive elements onto the wheel in a squeeze type arrangement. Accordingly, the friction drive elements may be formed with a barrel-shaped cross section.

BRIEF DESCRIPTION OF THE DRAWING

The present invention will be more fully understood and appreciated from the following detailed description, taken in conjunction with the drawings in which:

FIGS. 11A and 11B are respective side view illustrations of a further alternative arrangement of drive apparatus in respective non-engaged and engaged orientations;

DETAILED DESCRIPTION OF PREFERRED EMBODIMENTS

Figure 1A:
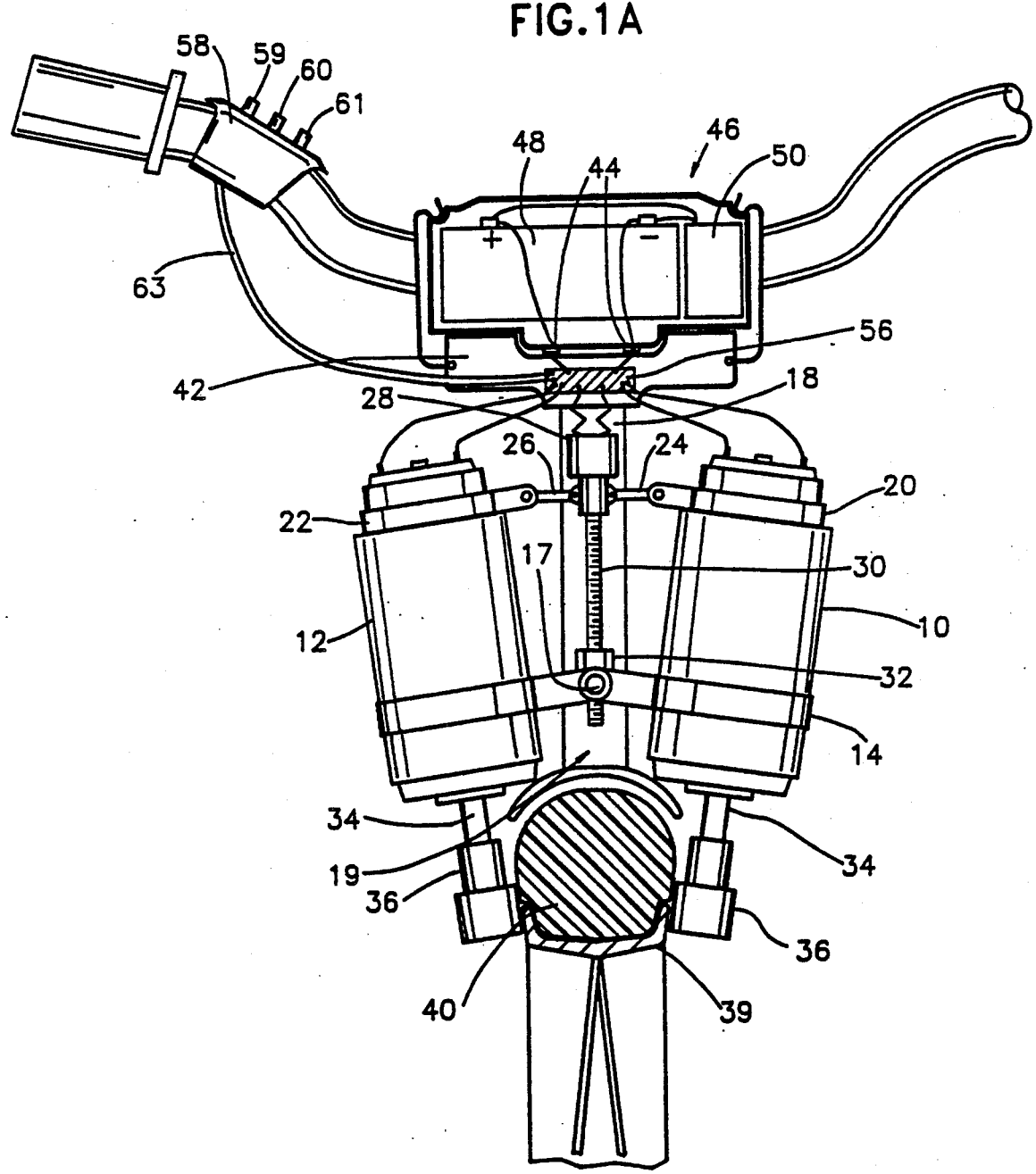
FIGS. 1A and 1B are pictorial illustrations of auxiliary drive apparatus constructed and operative in accordance with a preferred embodiment of the present invention in respective engaged and disengaged orientations.
Figure 1B:
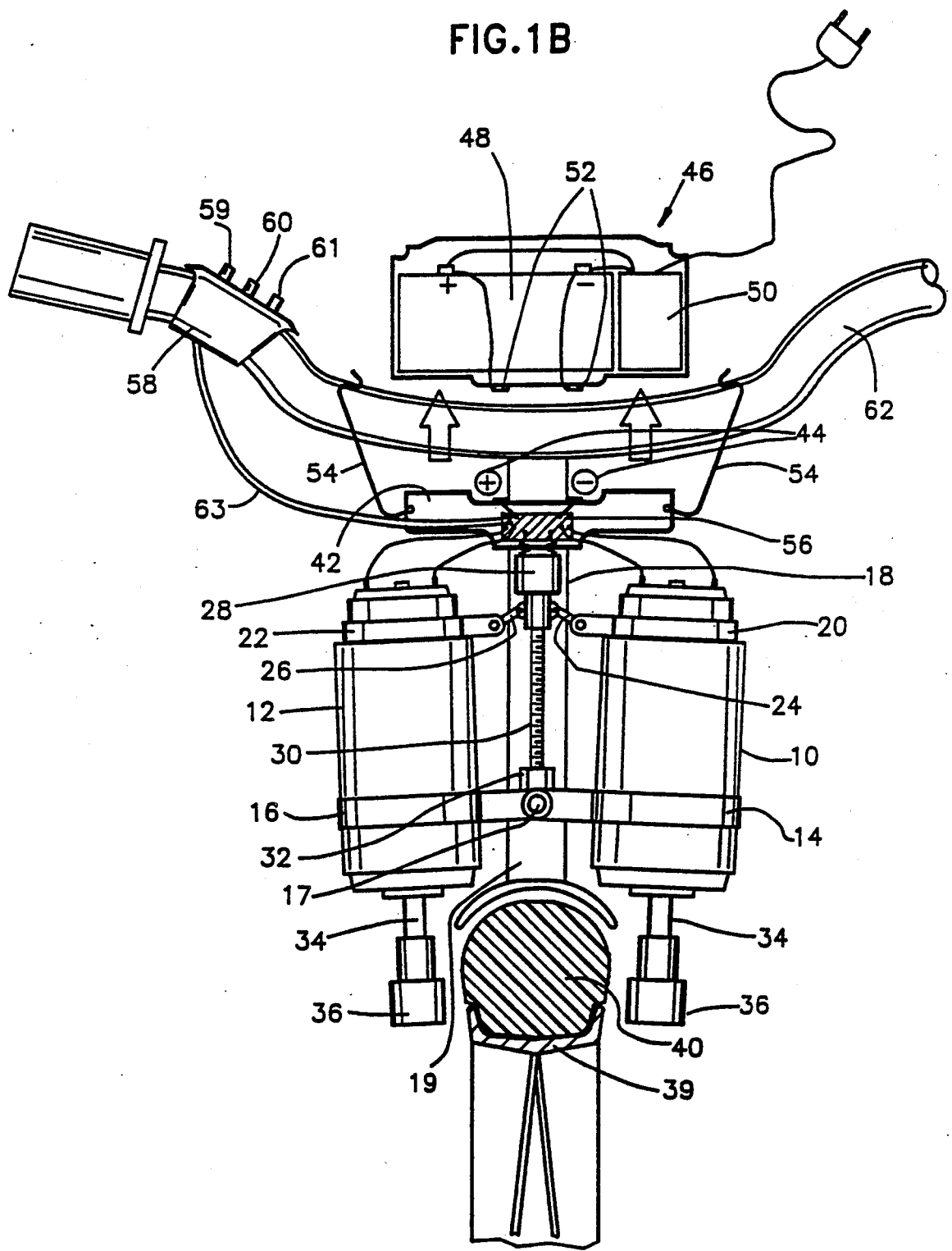

Reference is now made to FIGS. 1A and 1B which illustrate auxiliary drive apparatus constructed and operative in accordance with a preferred embodiment of the present invention, associated with a bicycle. In the illustrated embodiment first and second electric motors 10 and 12 are pivotably mounted by means of mounting brackets 14 and 16 respectively onto a pivot location 17 fixed with respect to the top part 18 of the fork 19 of the bicycle. Location 17 may be identical to the location onto which the front fender is mounted in many bicycles.

As seen in the illustrations, mounting brackets 14 and 16 engage respective motors 10 and 12 adjacent the lower portions thereof.

There are also provided mounting brackets 20 and 22 which engage the electric motors 10 and 12 respectively adjacent the upper portions thereof. The mounting brackets 20 and 22 are pivotably mounted onto respective intermediate linkages 24 and 26 which are in turn mounted onto an electric motor 28, whose output shaft is fixedly attached to a screw shaft 30. Screw shaft 30 engages a fixed nut 32 which is fixedly mounted onto the top part 18 of the fork 19, such that operation of the motor causes the motor to move either up or down along an axis defined by the screw shaft 30.

According to an alternative embodiment of the present invention, the motor 28 may be replaced by a manually operable device for selectably displacing the intermediate linkages 24 and 26, as illustrated in FIGS. 2A, 2B, 3A and 3B and described hereinbelow.

Motors 10 and 12 each include a drive shaft 34 onto which is mounted a friction driving element 36, typically formed of a high friction rubber or plastic material.

FIG. 1A illustrates the auxiliary drive apparatus oriented in a drive engagement orientation wherein the motor 28 is positioned to cause intermediate linkages 24 to define a maximum spread between respective mounting brackets 20 and 22. In this orientation, due to the pivot mounting of the motors about pivot location 17, maximum spreading of the top portions of the motors 10 and 12 causes the friction driving elements 38 of the respective motors 10 and 12 to be urged together in friction driving engagement with the vehicle wheel. Apparatus is preferably provided for maintaining the engagement force between the friction driving elements 36 and the wheel within a given range for maximum driving efficiency and minimum wear.

It is a particular feature of the present invention that the friction driving elements 36 preferably engage both a portion of the rim 39 and a portion of the tire 40, for enhanced driving efficiency.

It is also a particular feature of the present invention that the first and second motors 10 and 12 pivot about a single pivot point 17. As a result, should the bicycle wheel be eccentric, the motors 10 and 12 can follow the wheel in the pivot plane.

According to an alternative embodiment of the present invention, either of the motors 10 and 12 and its corresponding friction driving element 36 may be replaced by a freely rotating roller assembly which does not provide driving power to the wheel, while providing minimum resistance to rolling engagement with the wheel. This arrangement may be employed in any or all of the embodiments of the invention including those illustrated in FIGS. 1A-8 and described hereinbelow.

FIG. 1B illustrates the orientation of motors 10 and 12 in a disengaged orientation wherein the friction drive elements 36 are out of contact with the wheel.

Mounted on top part 18 of fork 19 is a quick coupling base element 42 which is formed with a plurality of electrical contacts 44 and is arranged to receive and support a portable rechargeable electrical energy source 46. Energy source 46 typically comprises a conventional rechargeable battery 48 and a conventional battery charger 50 which can operate on mains current. Energy source 46 is provided with a pair of electrical contacts 52 which are arranged to establish electrical contact with contacts 44 when the energy source 46 is seated on base element 42.

Base element 42 is provided with pivotable retaining clips 54 for removably retaining energy source 46 onto base element 42. It is a particular feature of the present invention that energy source 46 is readily removed from base element 42 by a user, and may be so removed at will for recharging, simply by pivoting clips 54 out of engaging relationship with the energy source 46.

In accordance with a preferred embodiment of the present invention at least one or both regenerative braking and dynamic braking may be provided. Regenerative braking may be provided relatively simply by allowing motion of the vehicle wheel to drive the electric motors as generator, thereby recharging the electrical energy source 46, while slowing down the vehicle wheel.

Selectably operable dynamic braking may be provided by short circuiting the terminals of each of the first and second motors. In order to prevent excessive braking which could cause overturning or excessive equipment wear, preferably the dynamic braking apparatus operates to short circuit the terminals in a pulsed mode. The regenerative and dynamic braking apparatus may be associated with any of the embodiments of the present invention.

According to a preferred embodiment of the present invention there is provided, preferably inside base element 42, electrical control circuitry 56 for governing the operation of the motors 10 and 12. The electrical control circuitry 56 may be entirely conventional and well within the knowledge of a person of ordinary skill in the art in view of the disclosure herein. A manually operated control array 58, including control actuator buttons 59, 60 and 61, is provided on a handlebar 62 and communicates with the electrical control circuitry 56 via a cable 63. Typically button 59 may be employed to cause engagement of the auxiliary drive apparatus with a wheel, while button 60 may be used to actuate forward driving and regenerative braking and button 61 may be used to provide dynamic braking respectively.

Figure 2A:
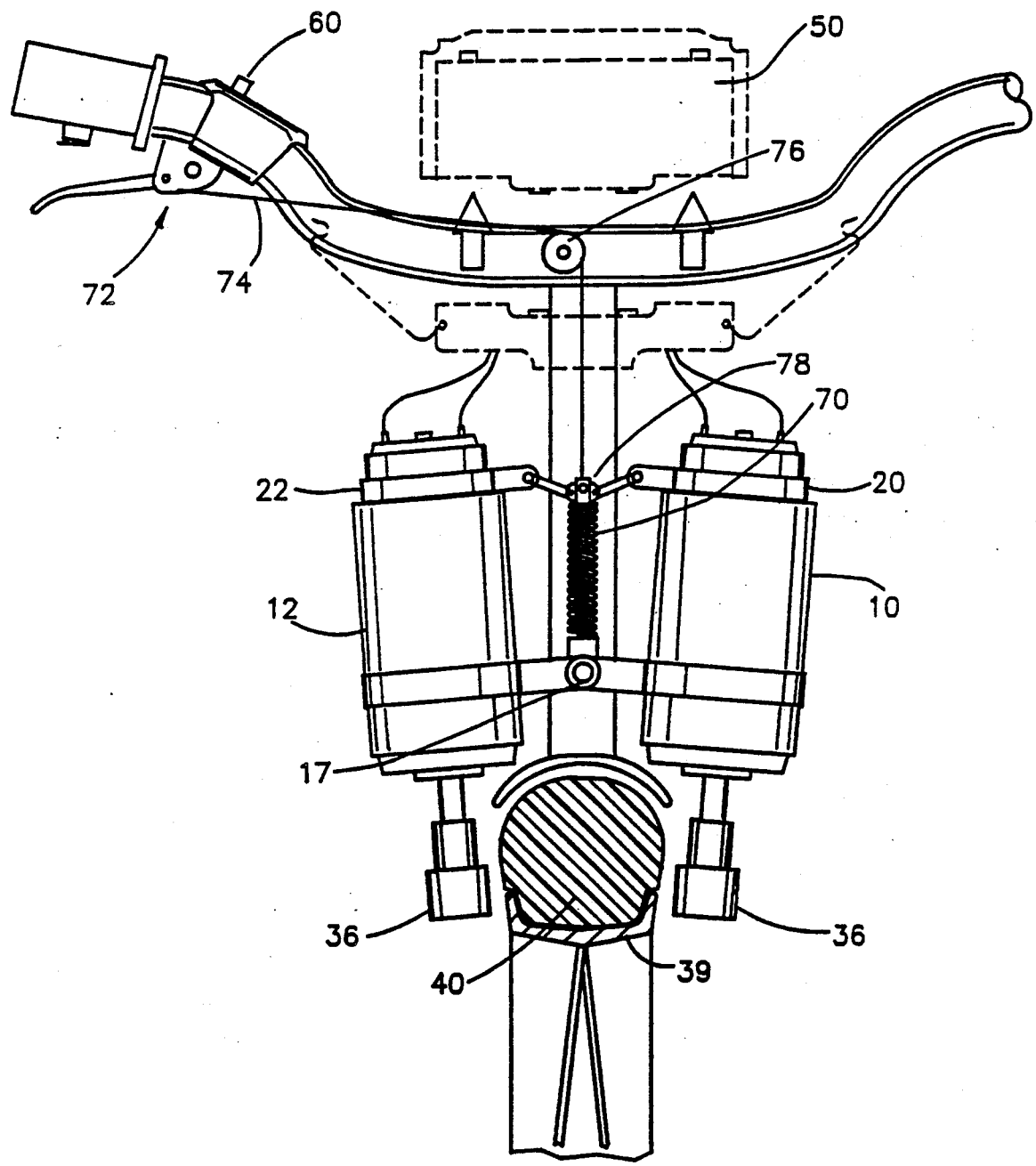
FIGS. 2A and 2B are pictorial illustrations of auxiliary drive apparatus constructed and operative in accordance with another preferred embodiment of the present invention in respective engaged and disengaged orientations.
Figure 2B:
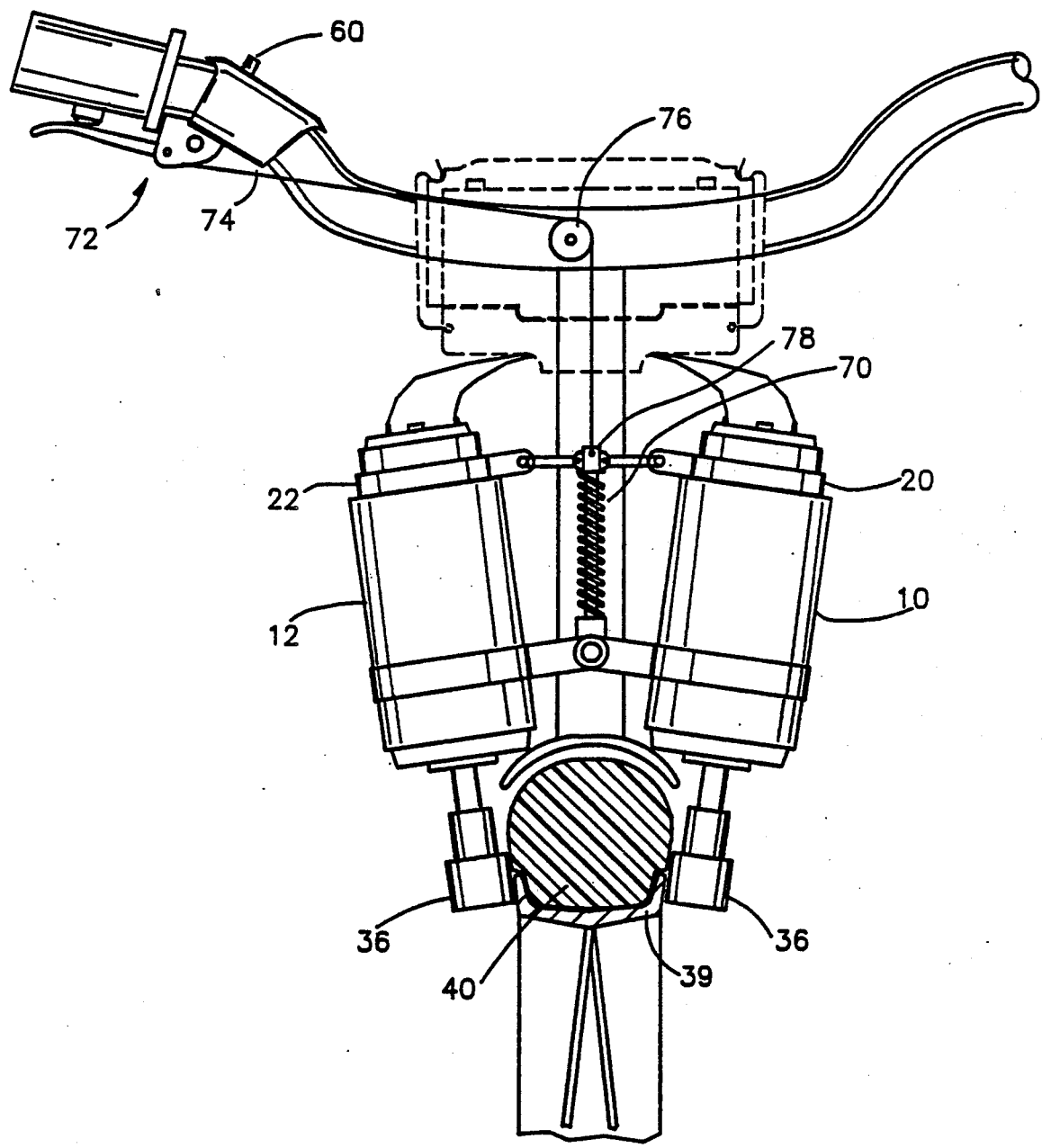

Reference is now made to FIGS. 2A and 2B which is similar to the embodiment of FIGS. 1A and 1B where motor 28 and associated screw shaft 30 is replaced by a manually operated spring arrangement 70 which normally urges motors 10 and 12 towards a non wheel engagement orientation as seen in FIG. 2A. Driving engagement of the auxiliary drive apparatus is provided by an operator depressing an operating lever 72, such as a lever of the type commonly employed as a handbrake actuator, thereby pulling on a cable 74, which extends from lever 72 over a roller 76, typically mounted on the handlebar 62, and raising a linkage 78.

Raising of linkage 78, causes intermediate linkages 24 to define a maximum spread between respective mounting brackets 20 and 22 on respective motors 10 and 12, producing friction driving engagement between friction driving elements 36 and the vehicle wheel. Suitable means may be provided for selectably locking lever 72 in the orientation illustrated in FIG. 2B.

A switch 79 is provided to sense full depression of lever 72, indicating full frictional driving engagement between elements 36 and the vehicle wheel. In accordance with a preferred embodiment of the invention, this indication is required before electrical power is provided to motors 10 and 12, in order to prevent undue wear of elements 36.

Figure 3A:
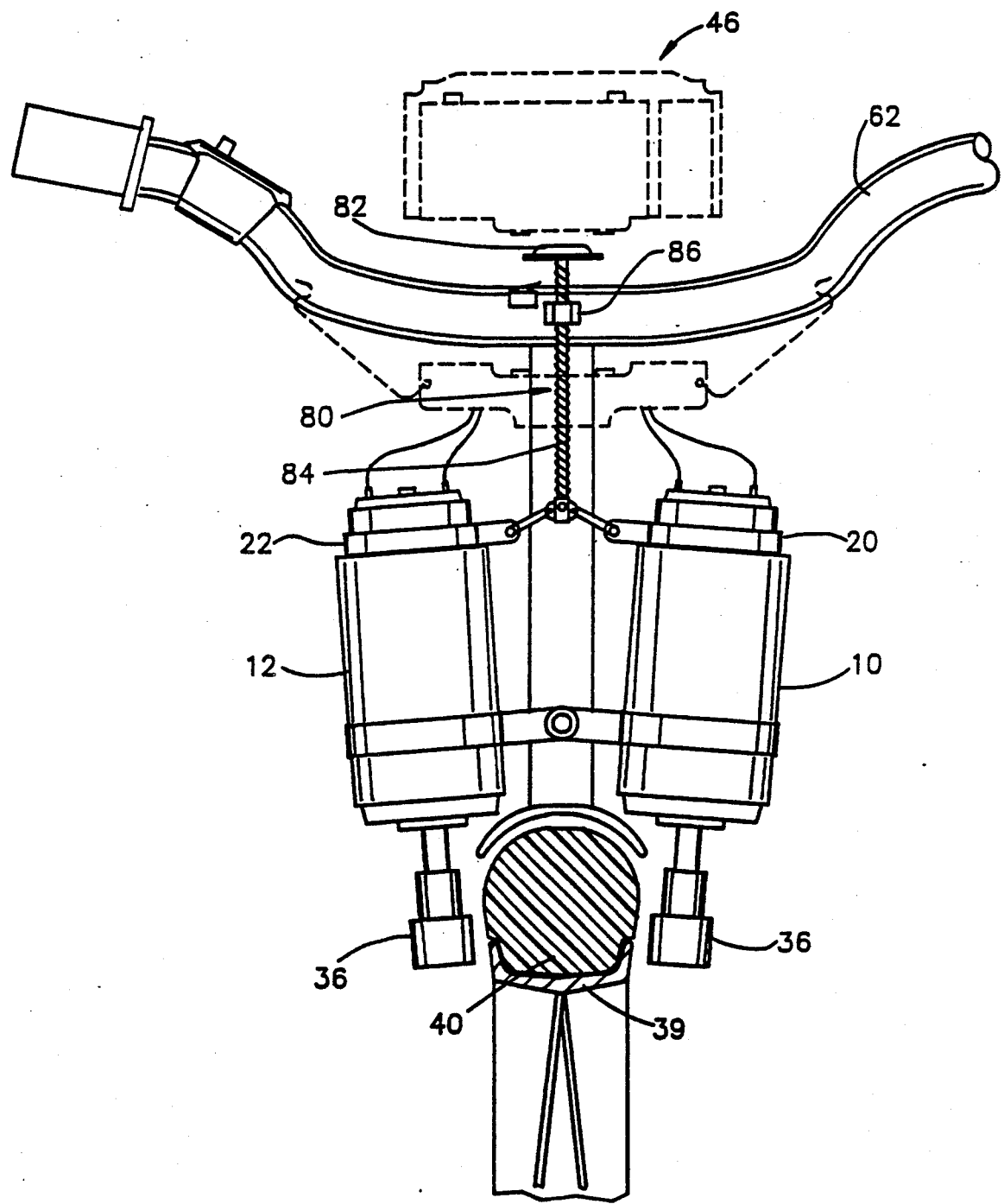
FIGS. 3A and 3B are pictorial illustrations of auxiliary drive apparatus constructed and operative in accordance with yet another preferred embodiment of the present invention in respective engaged and disengaged orientations.
Figure 3B:
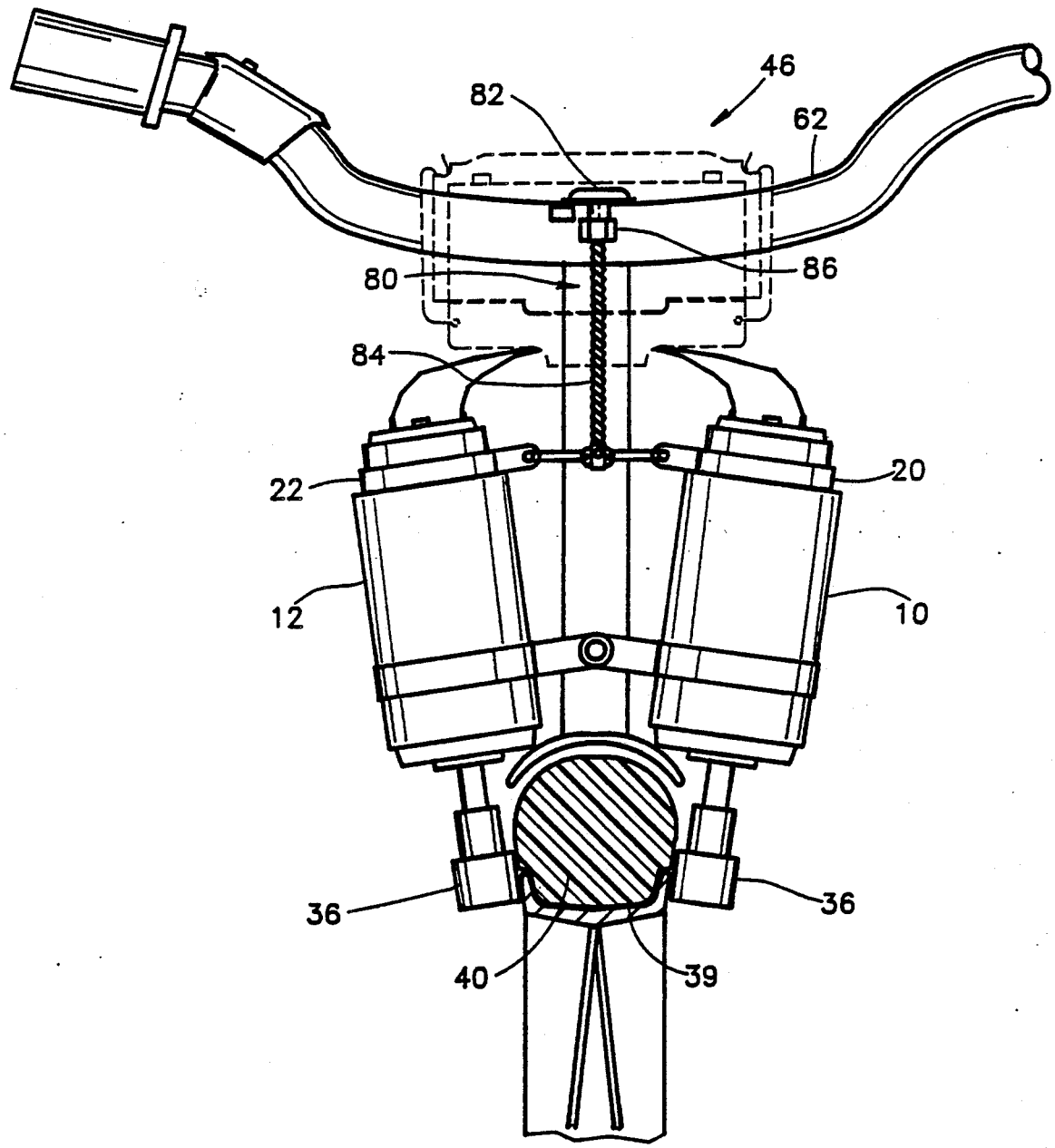

Reference is now made to FIGS. 3A and 3B which is similar to the embodiment of FIGS. 2A and 2B, wherein the handbrake type actuator lever 72 is replaced by a manually actuable, vertically displaceable screw arrangement 80, formed with a operator engageable vertical push knob 82. Depression of knob 82 causes a screw 84 to move downwardly and rotate relative to a fixed nut 86 mounted on handlebar 62. Downward movement of screw 84 causes intermediate linkages 24 to define a maximum spread between respective mounting brackets 20 and 22 on respective motors 10 and 12, producing friction driving engagement between friction driving elements 36 and the vehicle wheel. Suitable means may be provided for selectably locking screw 84 in the orientation illustrated in FIG. 3B.

A switch 88 is provided to sense full depression of knob 82, indicating full frictional driving engagement between elements 36 and the vehicle wheel. In accordance with a preferred embodiment of the invention, this indication is required before electrical power is provided to motors 10 and 12, in order to prevent undue wear of elements 36.

Figure 4:
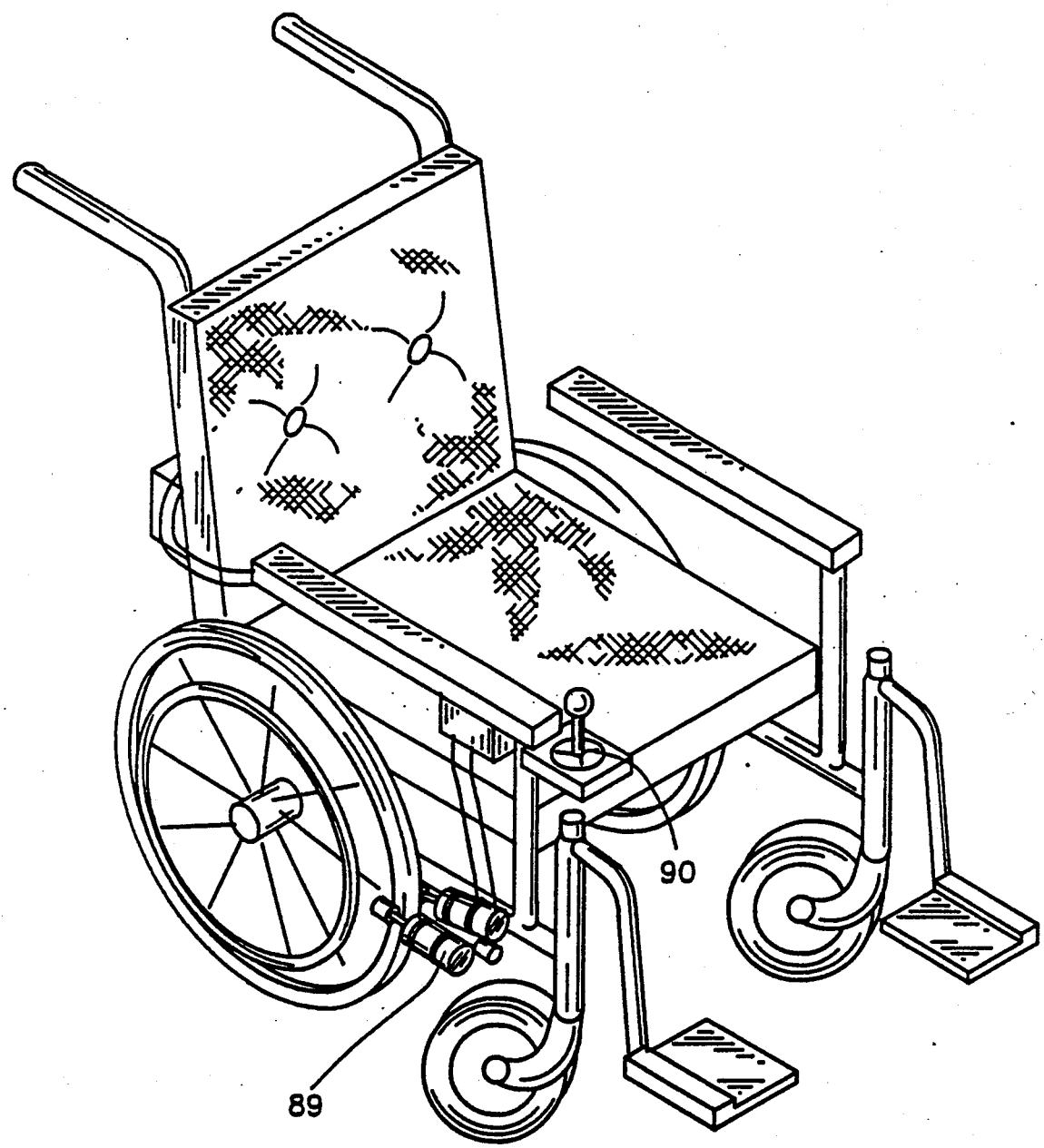
FIG. 4 is a pictorial illustration of auxiliary drive apparatus constructed and operative in accordance with an alternative embodiment of the invention mounted onto a wheelchair.
Figure 5:
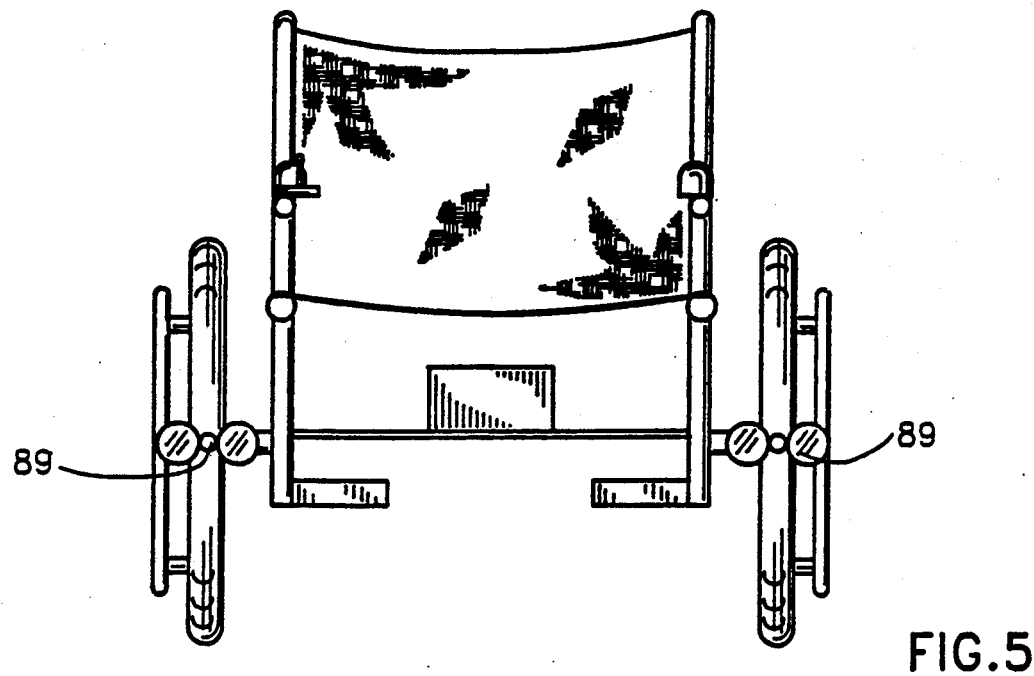
FIGS. 5 and 6 are respective top and back view illustrations of the apparatus of FIG. 4.
Figure 6:
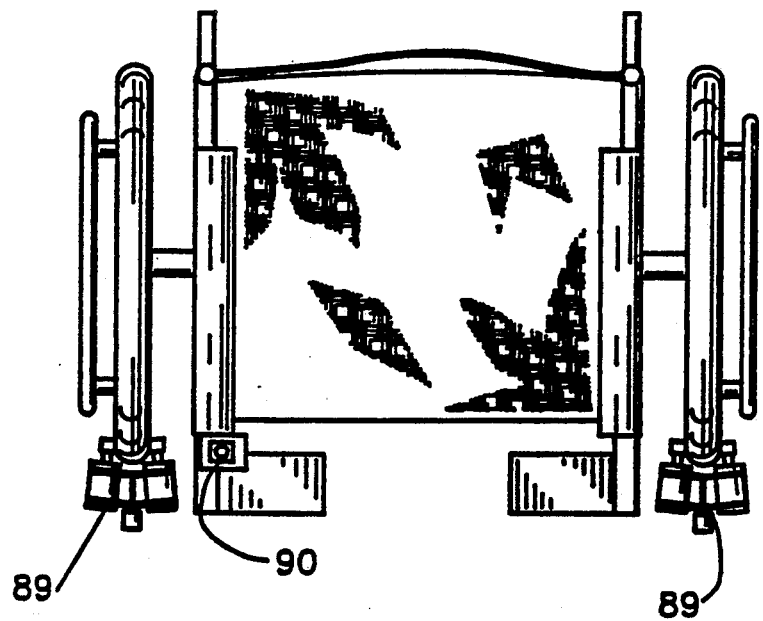

Reference is now made to FIGS. 4, 5 and 6 which illustrate a wheelchair which is fitted with an electrical auxiliary drive 89 on each of its two back wheels. The wheelchair is typically controlled by an operator via a joy-stick 90, via suitable control circuitry (not shown) which provides power to the electrical auxiliary drive associated with each wheel in accordance with the desired direction and speed of travel in accordance with conventional techniques. The structure and operation of the auxiliary drive may be as described hereinabove in connection with any one or combination of FIGS. 1A–3B.

Figure 7:
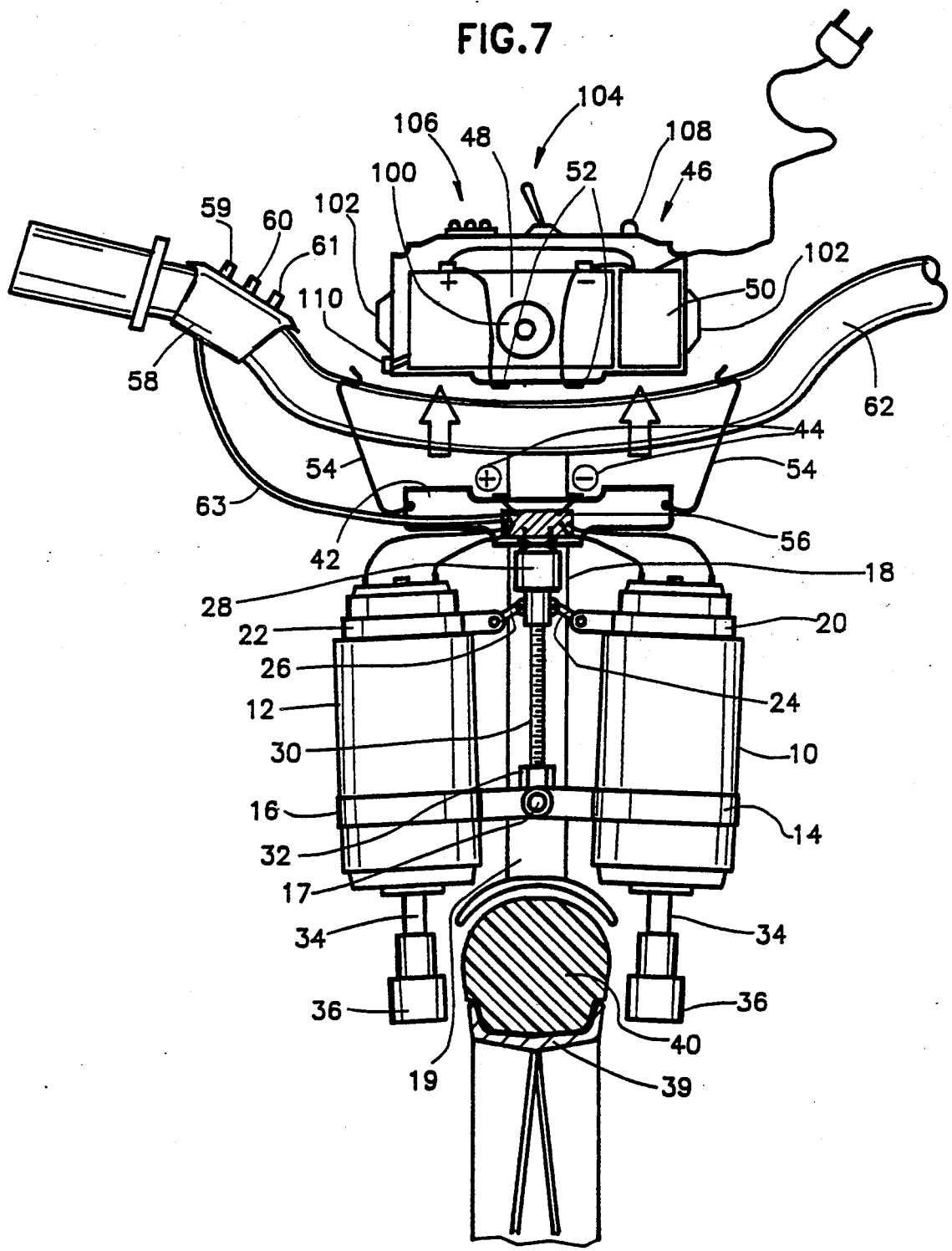
FIG. 7 is a pictorial illustration of an alternative embodiment of the apparatus of FIG. 1.

Reference is now made to FIG. 7, which illustrates additional features which may be associated with the present invention. FIG. 7 is essentially similar to FIG. 1B but also illustrates the following additional elements: Mounted on energy source 46 may be a front headlight 100, turn signal lights 102, and a turn signal indicator switch 104, all of which may draw power from the power source 46 and operate in a conventional manner. Battery status indicator lights 106 may be provided on the power source 46.

A hazard warning light actuator 108 may produce pulsed operation of headlight 100 and turn signal lights 102. A DC power outlet 110 may provide auxiliary DC power for various devices, such as audio equipment (not shown). An electrical mains power connector 112 may be provided for connecting the recharger 50 directly to mains power for recharging of power source 46. It is appreciated that any or all of the apparatus illustrated in FIG. 7 may be incorporated in any of the embodiments illustrated in FIGS. 1A–6.

Figure 8:
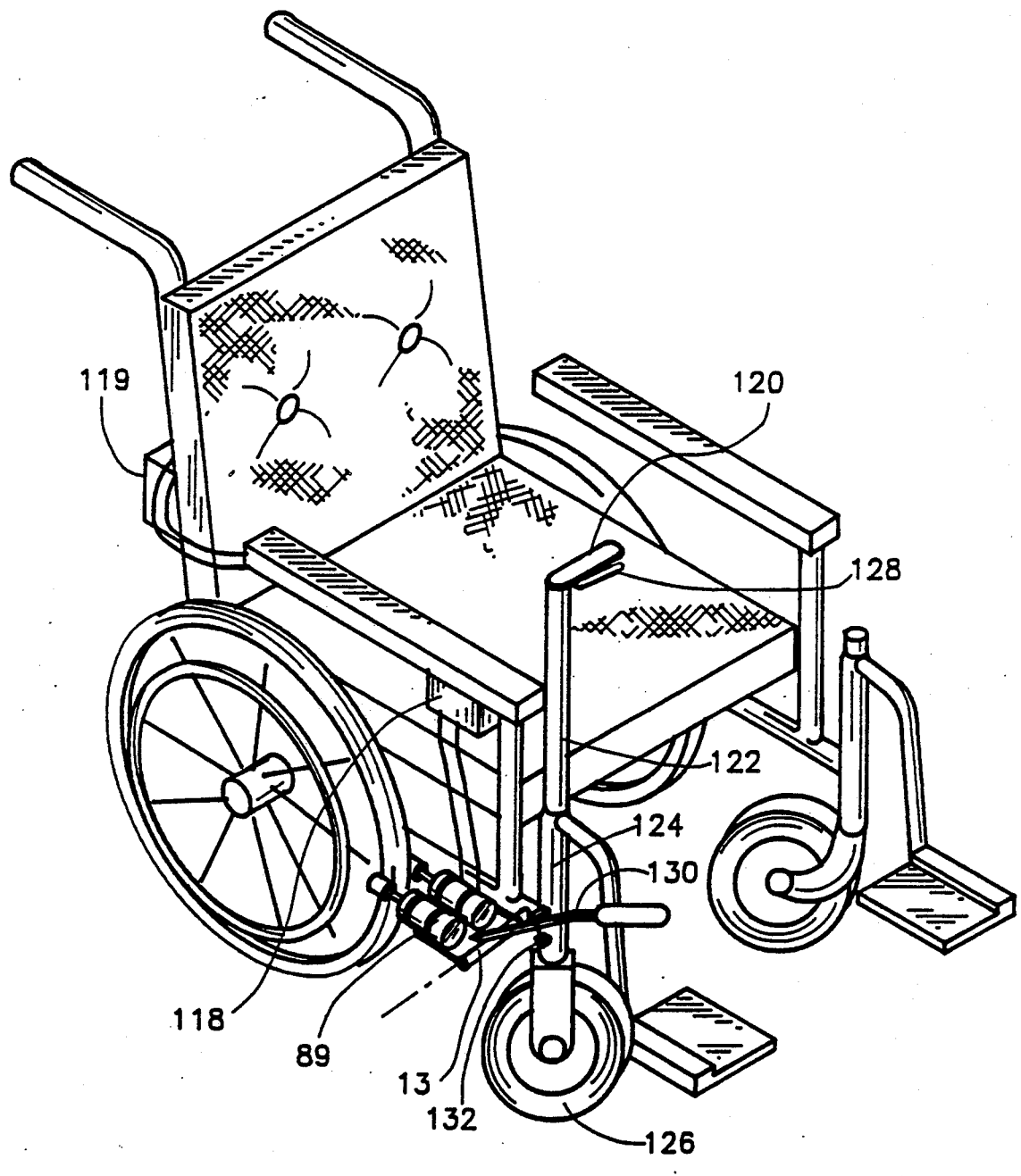
FIG. 8 is a pictorial illustration of auxiliary drive apparatus of the invention mounted onto a wheelchair in accordance with an alternative embodiment of the present invention.

Reference is now made to FIG. 8 which illustrates a wheelchair which is fitted with an electrical auxiliary drive 89 on only one its two back wheels. The wheelchair is typically controlled by an operator via a suitable motor controller 118, via conventional suitable control circuitry including a battery 119 which provides power to the electrical auxiliary drive associated with the wheel in accordance with the desired speed of travel in accordance with conventional techniques. The structure and operation of the auxiliary drive may be as described hereinabove in connection with any one or combination of FIGS. 1A–3B.

Steering of the wheelchair is preferably provided by a handle 120 which is preferably mounted at right angles to an extension 122 of the mounting shaft 124 of one of the front wheels 126 and governs the azimuthal orientation of that wheel in a direct manner. It is a particular feature of the present invention that effective drive and steering of the vehicle is provided by an auxiliary drive associated with only one of the back wheels and by a steering mechanism operating directly on only one of the front wheels, preferably the wheel in front of the driven back wheel.

A speed control lever 128 may be associated with handle 120 and provide a manual speed control input to the motor controller 118.

Engagement of the auxiliary drive with one of the back wheels of the wheelchair may be governed manually by suitable positioning of a handle 130 which determines in cooperation with selectable handle retaining means 132 the orientation of the friction drive elements of the auxiliary drive in one of two selectable orientations, an operating orientation wherein the friction drive elements are in driving engagement with the wheelchair wheel and a non-driving orientation wherein the friction drive elements are out of drive engagement with the wheelchair wheel.

The structure of the mounting arrangement including handle 130 will be understood more clearly from a consideration of FIGS. 9A, 9B, 9C and 9D and the description which follows:

Reference is now made to FIGS. 9A, 9B, 9C and 9D, which illustrate an alternative system for selectably positioning the auxiliary drive in one of two selectable orientations, an operating orientation wherein the friction drive elements are in driving engagement with a vehicle wheel and a non-driving orientation wherein the friction drive elements are out of drive engagement with the vehicle wheel.

Figure 9A:
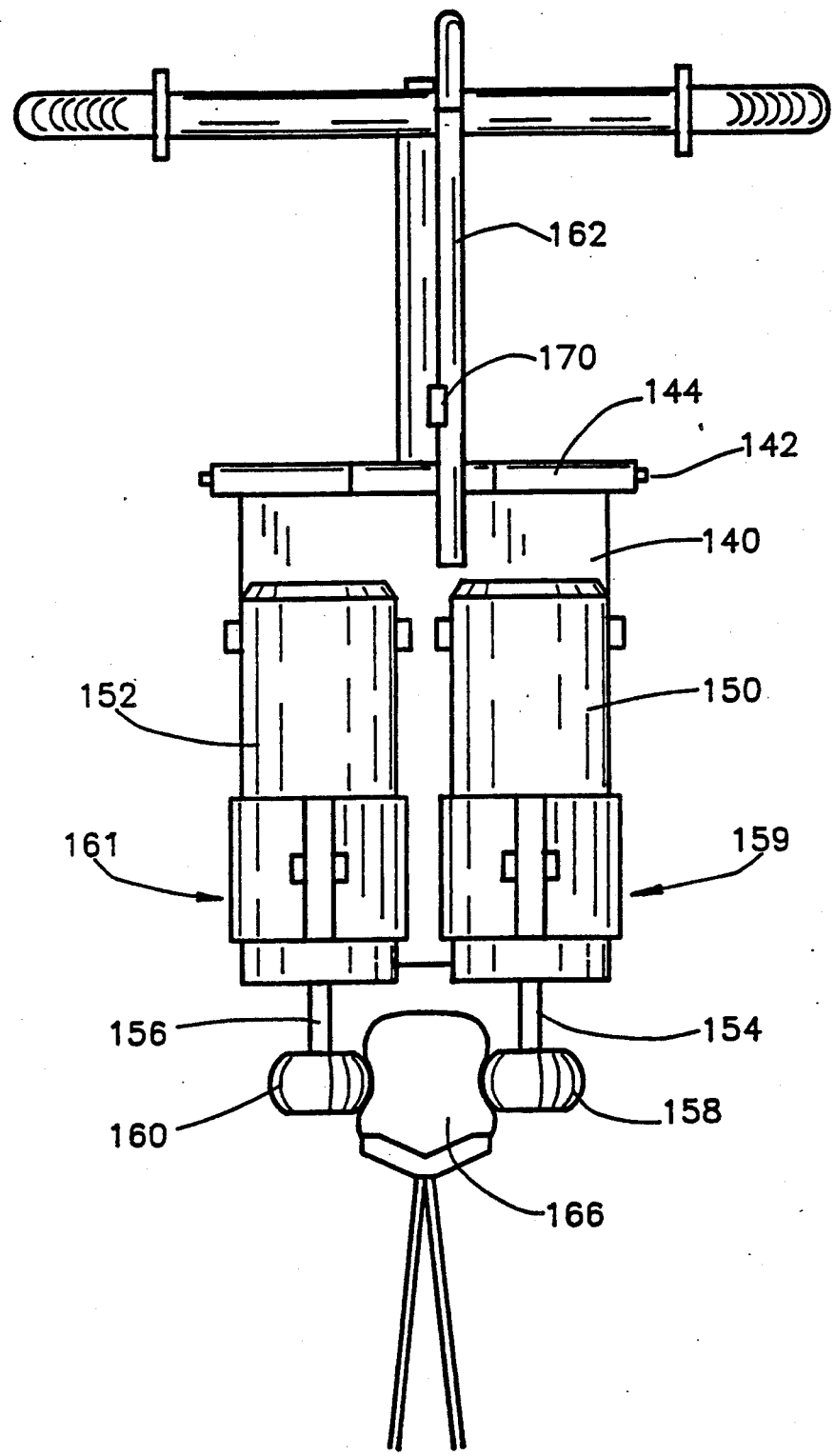
FIGS. 9A, 9B, 9C and 9D are respective front, side, partial sectional top, and back view illustrations of an alternative arrangement of drive apparatus of the present invention.
Figure 9C:
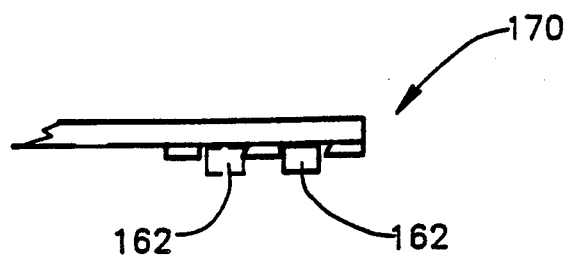
Figure 9B:
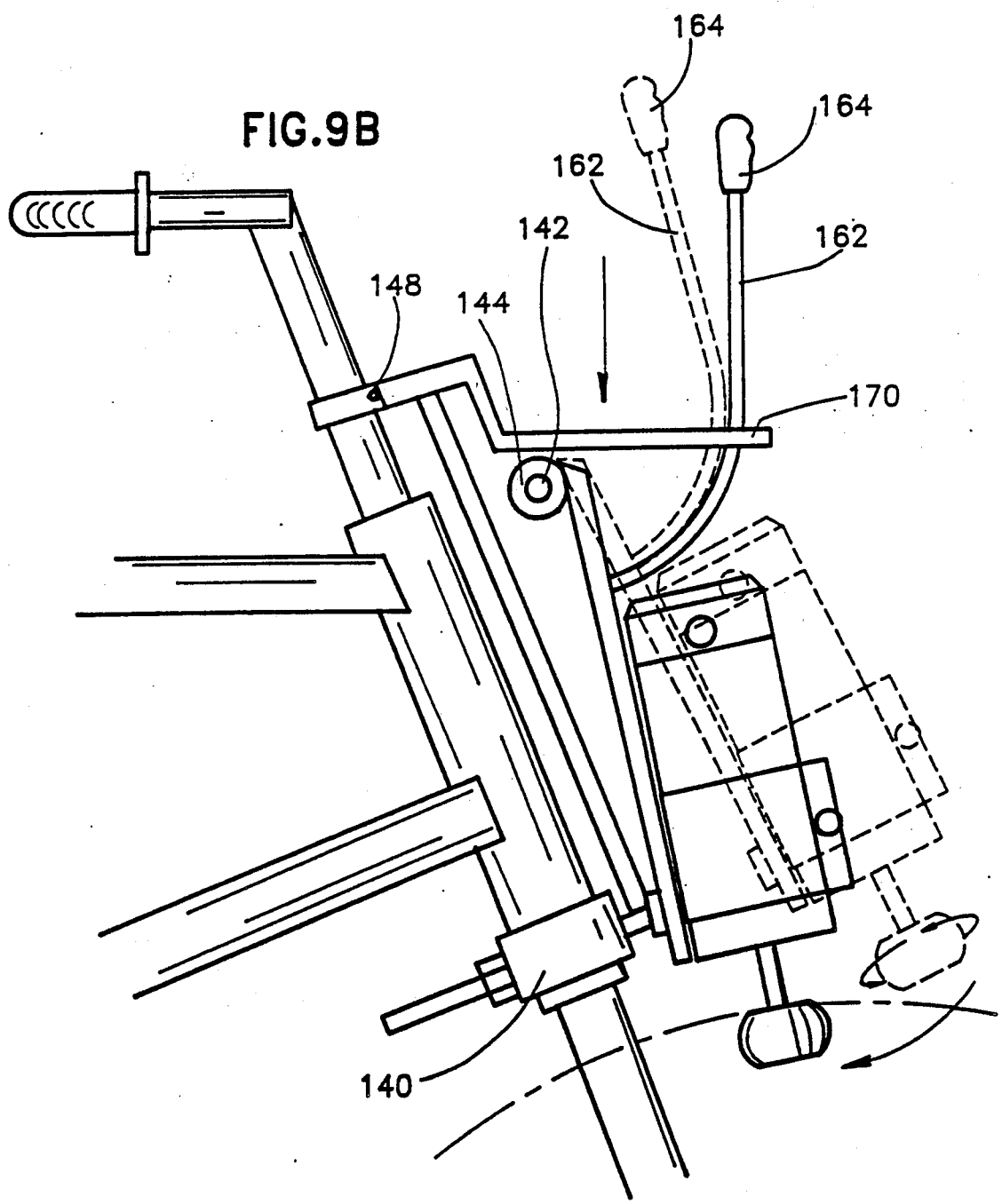

The apparatus of FIGS. 9A, 9B and 9C is shown in the context of a bicycle, it being appreciated that it is equally applicable to wheelchair applications or to any other suitable application. The apparatus of FIGS. 9A, 9B and 9D comprises an auxiliary drive support assembly 140 which is pivotably mounted onto a support axle 142. Support axle 142 is preferably resiliently mounted onto the frame of the vehicle via a resilient sleeve 144 and mounting assemblies 146 and 148.

An auxiliary drive unit comprising first and second electric motors 150 and 152, drive shafts 154 and 156 and drive rollers 158 and 160, typically formed of aluminum or plastic, having a smooth surface and preferably a barrel shaped cross section as illustrated, are fixedly mounted onto support assembly 140 by means of clamps 159 and 161.

Figure 9D:
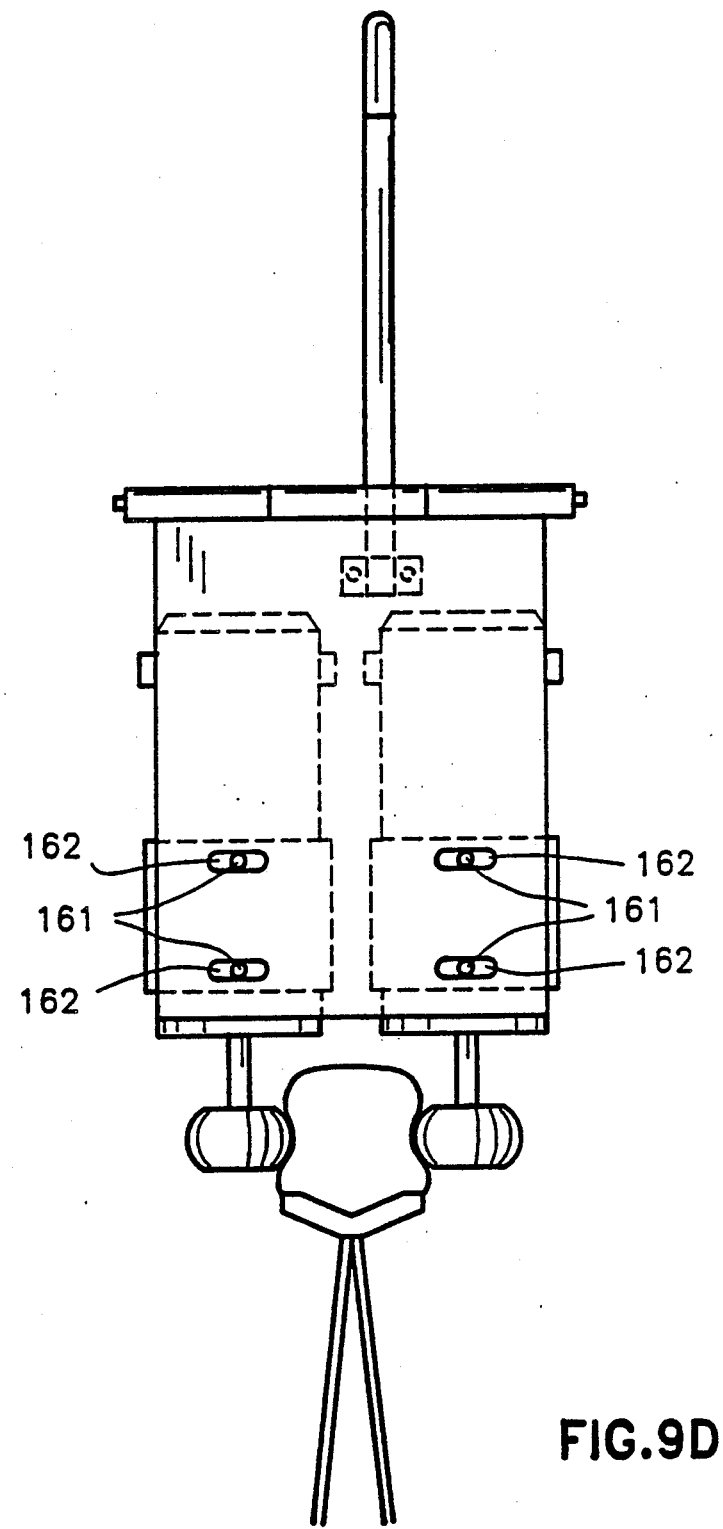

Mounting of the electric motors 150 and 152 is preferably provided as illustrated in FIG. 9D, wherein the spacing between the drive rollers 158 and 160 is adjustable to match different wheel dimensions, by means of mounting screws 161 and slots 162, but is fixed in normal use.

Fixedly associated with the support assembly is a manually engageable positioning handle 163, typically having a hand grip 164, whose position determines whether the auxiliary drive unit is in an operative orientation in engagement with a vehicle wheel 166, as illustrated in FIG. 9A and in solid lines in FIG. 9B, or in an inoperative orientation out of engagement with the vehicle wheel, as shown in phantom in FIG. 9B.

A selectable position handle retaining member 170 is fixedly mounted onto mounting assembly 148 and provides a number of notched locations for removable retention of the handle 162, as illustrated in FIG. 9C.

It is noted that the apparatus of FIGS. 9A–9D provides a highly efficient and simple mechanism for governing the engagement of the auxiliary drive apparatus with a vehicle wheel. Operative engagement of the drive rollers 158 and 160 with the vehicle wheel 166 is achieved effectively by rolling the rollers 158 and 160 onto the wheel 166 until they drivingly engage the wheel in squeeze fit arrangement as illustrated.

Figure 10:
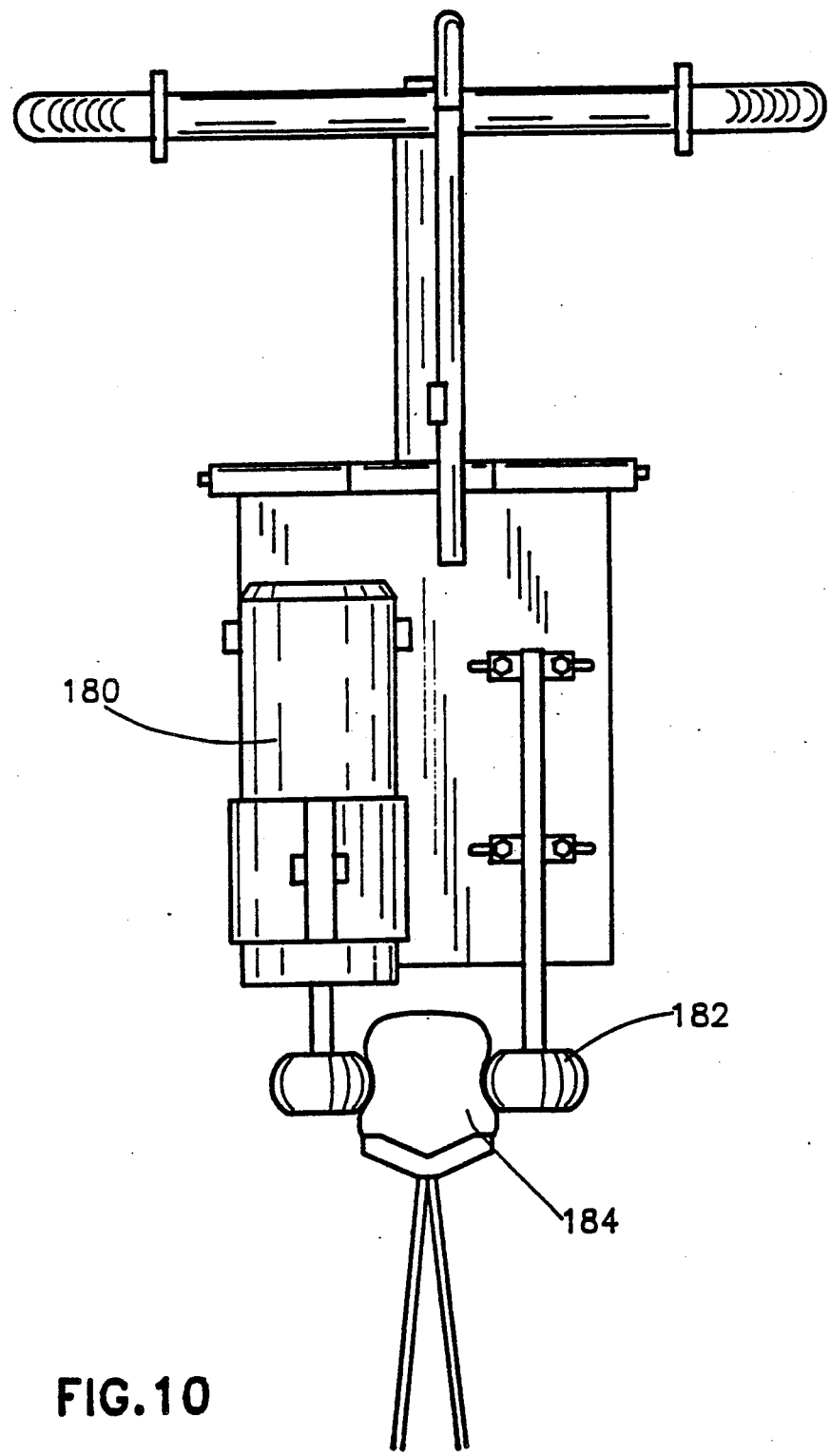
FIG. 10 is a front view illustration of a variation of the embodiment of FIGS. 9A-9D.

Reference is now made to FIG. 10 which illustrates a variation of the embodiment of FIGS. 9A-9D, wherein only a single electric motor 180 is employed and a bearing mounting platan roller 182 is mounted on the opposite side of a vehicle wheel 184, as illustrated. Other than the elimination of motor 180, the embodiment of FIG. 10 may be identical to that shown in and described in connection with FIGS. 9A-9D.

According to a preferred embodiment of the invention, the electric motor drive is controlled such that no driven rotational motion of the drive elements is provided when the vehicle wheel with which they are in engagement is stationary. This arrangement eliminates unnecessary wear and load on the drive elements, vehicle wheels and electric motors.

Reference is now made to FIGS. 11A, 11B, 11C and 12, which illustrate an alternative driving arrangement constructed and operative in accordance with a preferred embodiment of the invention.

In the illustrated embodiment, first and second electric motors 200 and 202, each with an associated drive roller 204 are mounted in spaced parallel relationship on a flexible support plate 206, which is, in turn, supported on a selectable positioning member 208. Selectable positioning member 208 defines an upper handle portion 210 and is selectably positionable, by engagement of the handle portion 210 by the hand of a user, about a pivot location 212 defined on a mounting element 214, which may be fixed to the body of a vehicle, such as a bicycle or a wheelchair by a bracket 220. In FIG. 11A, the apparatus is shown in a disengaged orientation, and in FIGS. 11B and 12, the apparatus is an engaged orientation for driving the vehicle by frictional engagement with a vehicle wheel 216. In the engaged orientation, the rotational orientation of the motors 200 and 202 is determined by a selectably positionable, stopper member 221.

Figure 11C:
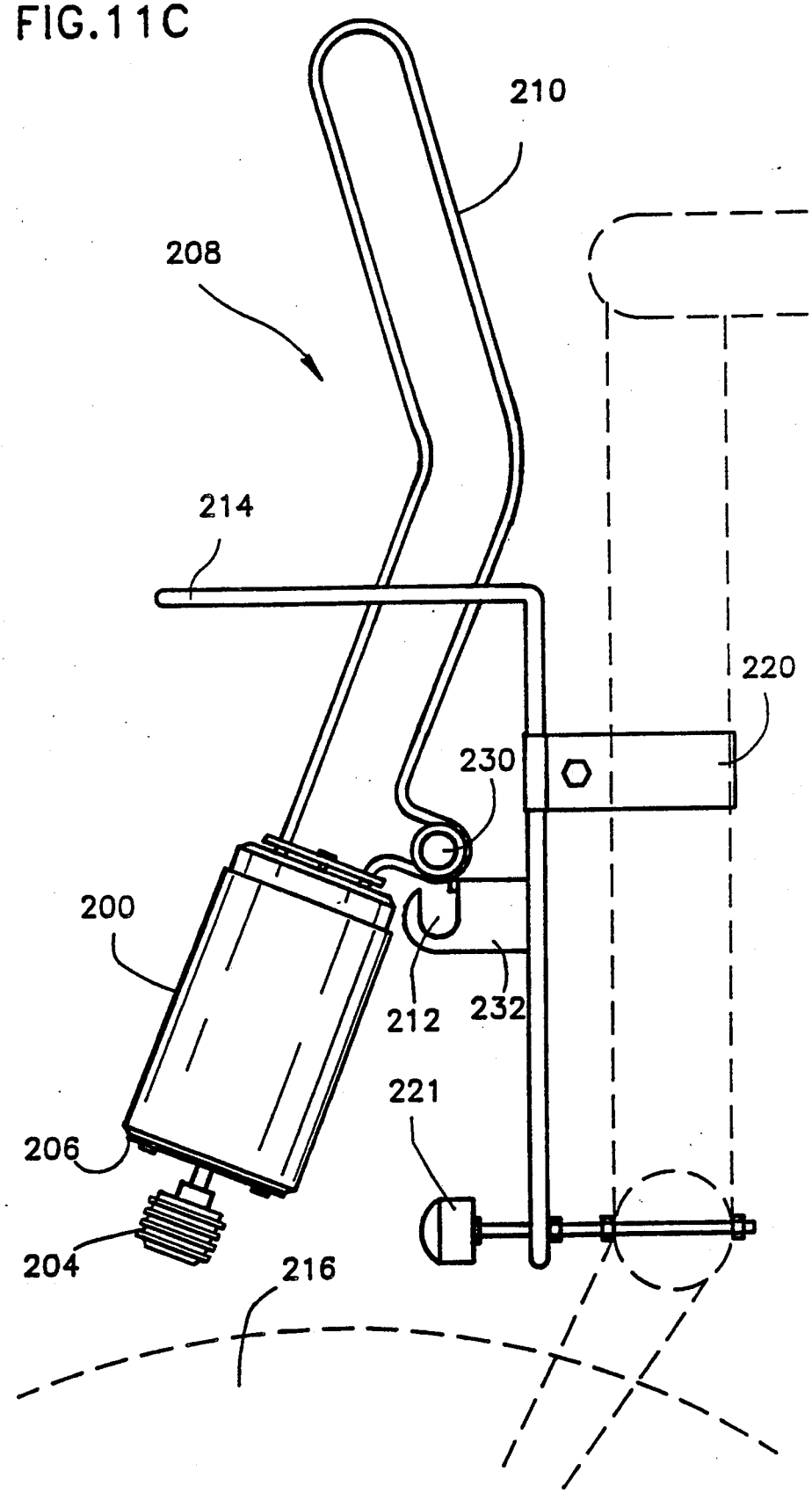
FIG. 11C is a side view illustration of the apparatus of FIGS. 11A and 11B in a decoupled orientation.
Figure 12:
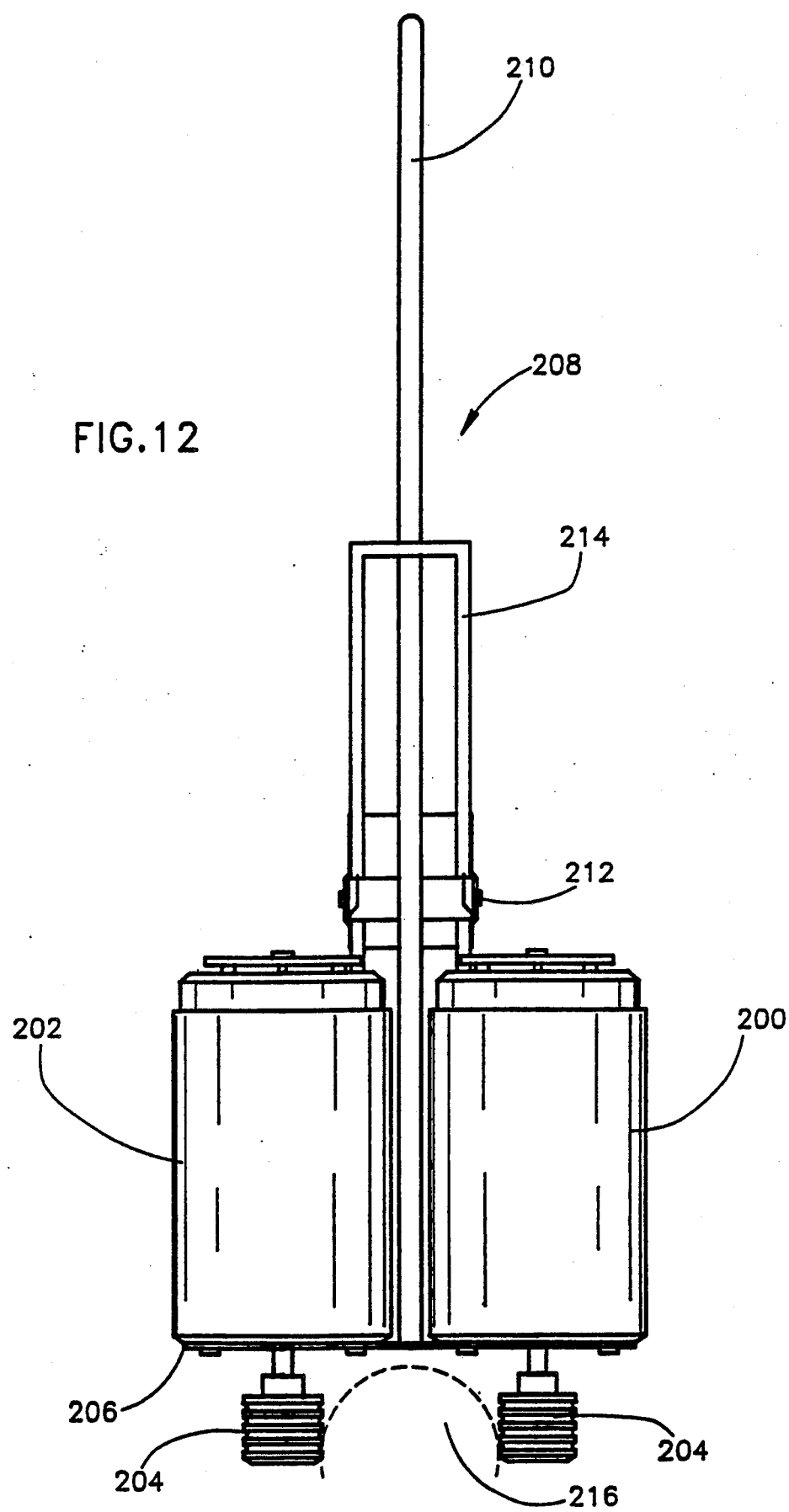
FIG. 12 is a front view illustration of the drive apparatus of FIG. 11B.
Figure 13A:
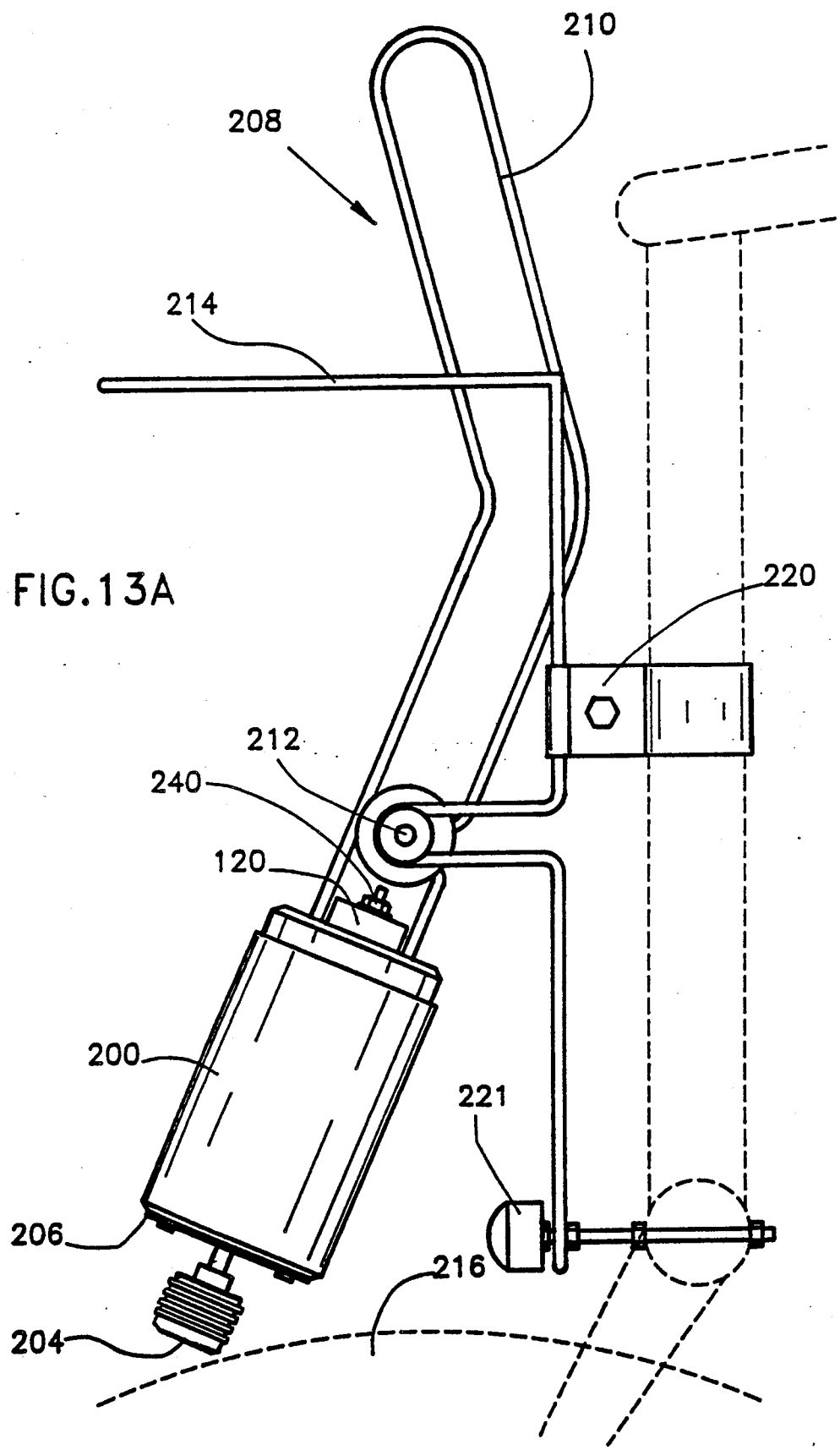
FIGS. 13A and 13B are respective side view illustrations of yet another alternative arrangement of drive apparatus in respective non-engaged and engaged orientations.
Figure 13B:
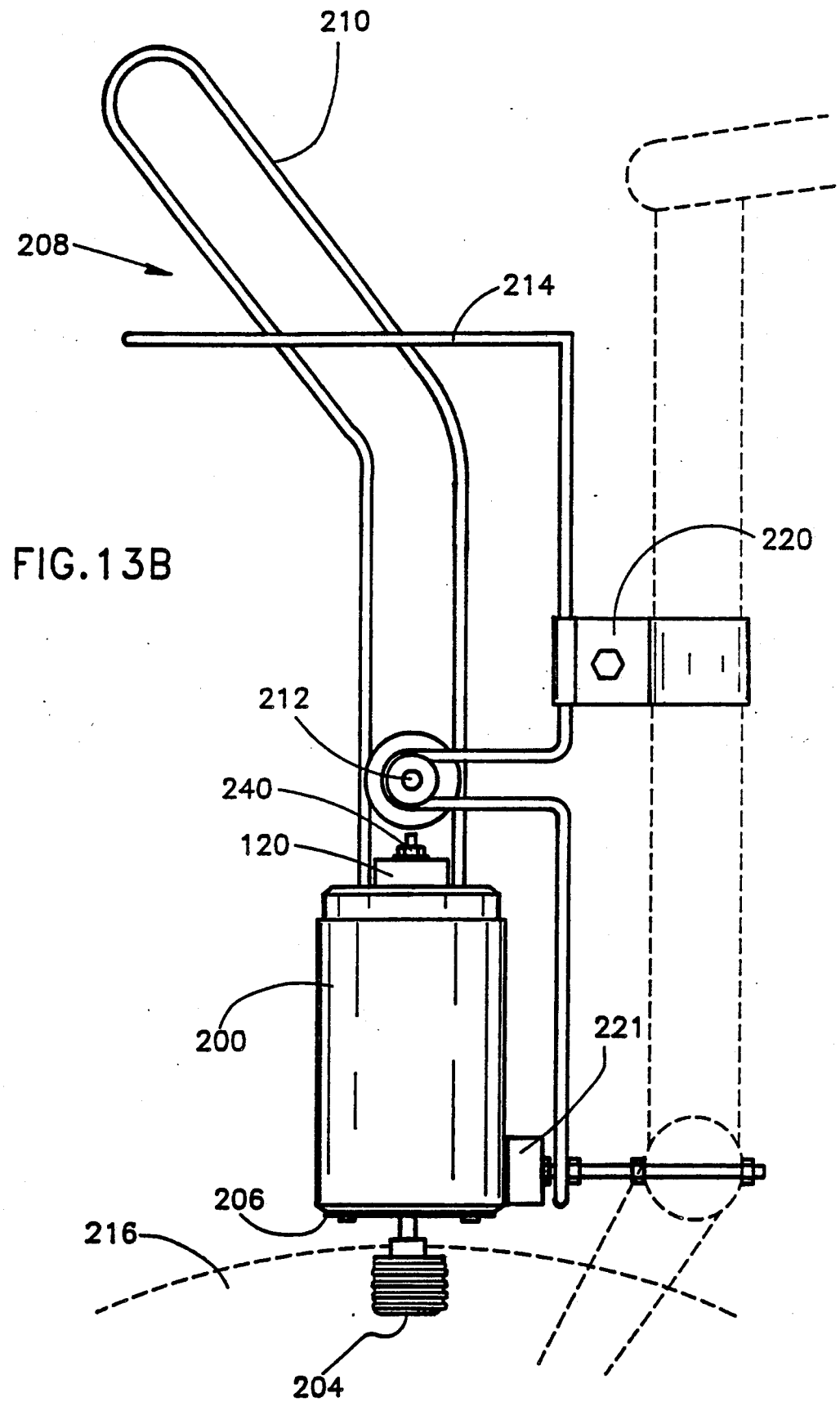
Figure 14:
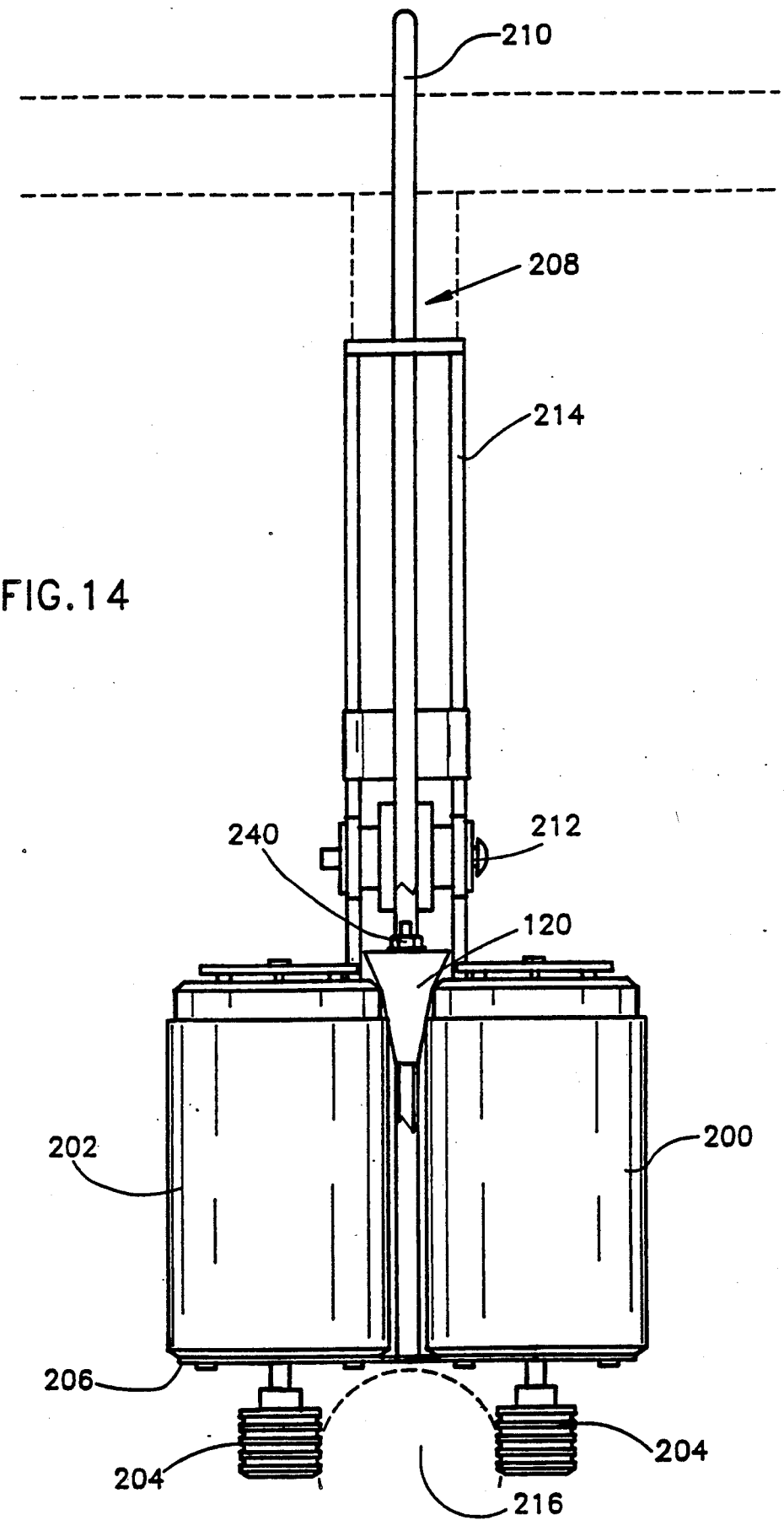
FIG. 14 is a front view illustration of the drive apparatus of FIG. 11B in a non-driving orientation.

It can be seen from a consideration of FIG. 11C that the auxiliary drive assembly comprising motors 200 and 202, rollers 204, plate 206, and positioning member 208, may be disengaged from the vehicle by removing a pivot axle 230 from mounting bracket or socket 232, which defines pivot location 212.

In this connection reference is made to FIGS. 16A-16E, which illustrate a portion of pivot axle 230 and mounting bracket or socket 232. It is seen that pivot axle 230 is formed with a slot 234 which is arranged such that when the pivot axle 230 is properly positioned in bracket 232 at a predetermined angular orientation about pivot location 212, it may clear a protrusion, which is associated with bracket 232.

Figure 16B:
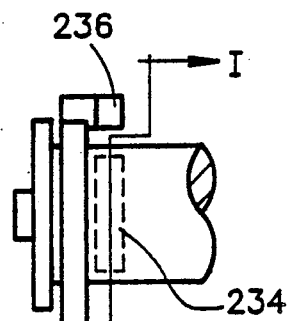
FIG. 16B is a side view illustration corresponding to FIG. 16A.
Figure 16E:
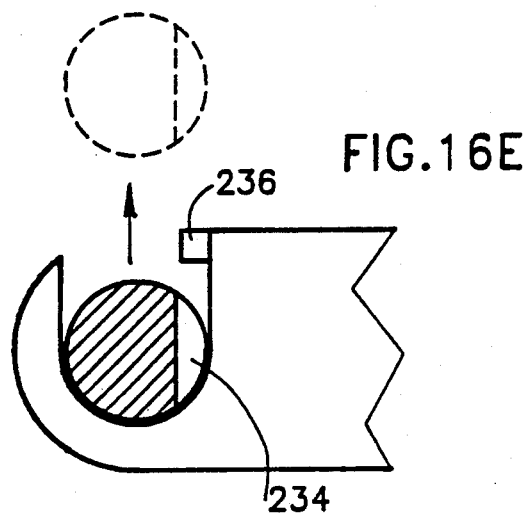
FIGS. 16C, 16D and 16E are illustrations taken along lines I—I in FIG. 16B, corresponding to orientations shown in FIGS. 11A, 11B and 11C.
Figure 16A:
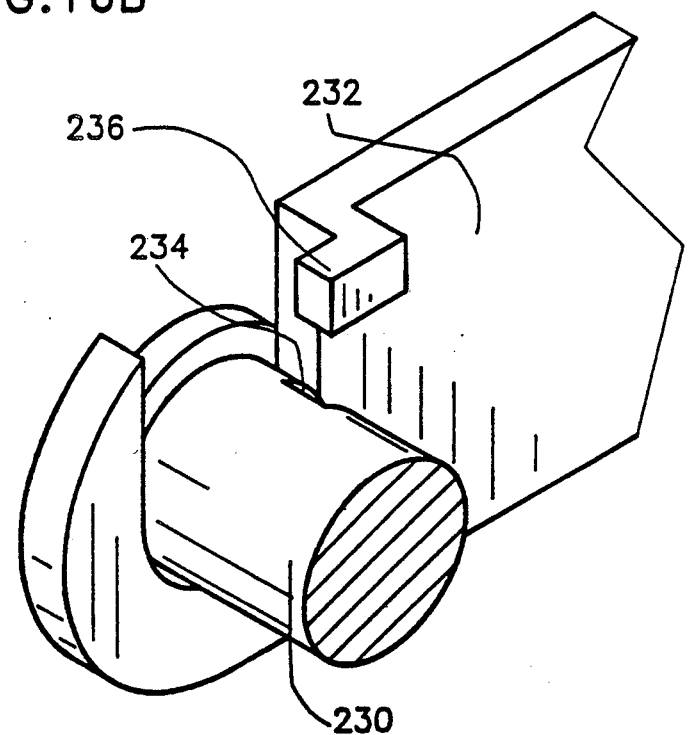
FIG. 16A is a pictorial illustration of part of the apparatus of FIGS. 11A-11C.
Figure 16C:
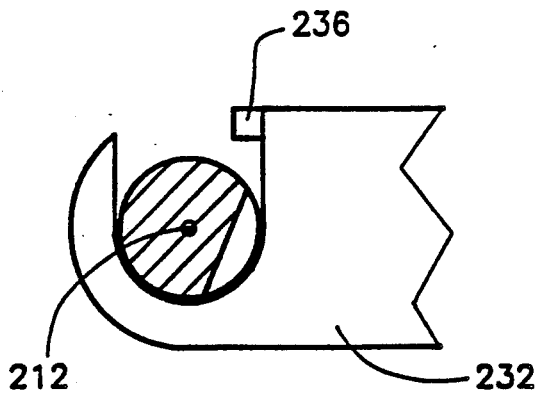
Figure 16D:
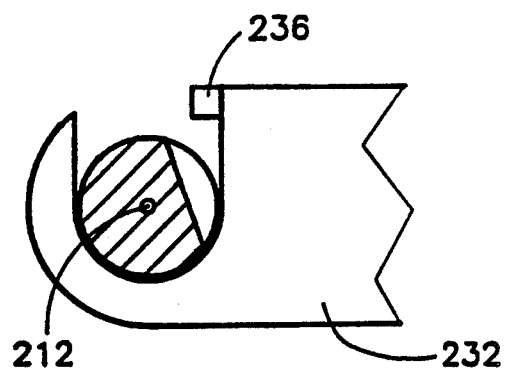

Thus, it may be readily appreciated that when the axle 230 is positioned as shown in FIG. 16E, corresponding to the orientation illustrated in FIG. 11C, the auxiliary drive assembly may be decoupled from the bracket 232. At other orientations, such as the disengaged orientation, shown in FIGS. 11A and 16C or the driving orientation, shown in FIGS. 11B and 16D, such decoupling is not possible.

Reference is now made to FIGS. 13A, 13B, 14 and 15 which illustrate another embodiment of auxiliary drive apparatus constructed and operative in accordance with a preferred embodiment of the present invention. The overall arrangement is similar to that of the embodiment of FIGS. 11A, 11B and 12 and similar reference numerals are employed for similar elements. The decoupling feature illustrated in FIG. 11C is not provided in this illustrated embodiment, although such a feature could be provided in combination therewith.

Figure 15:
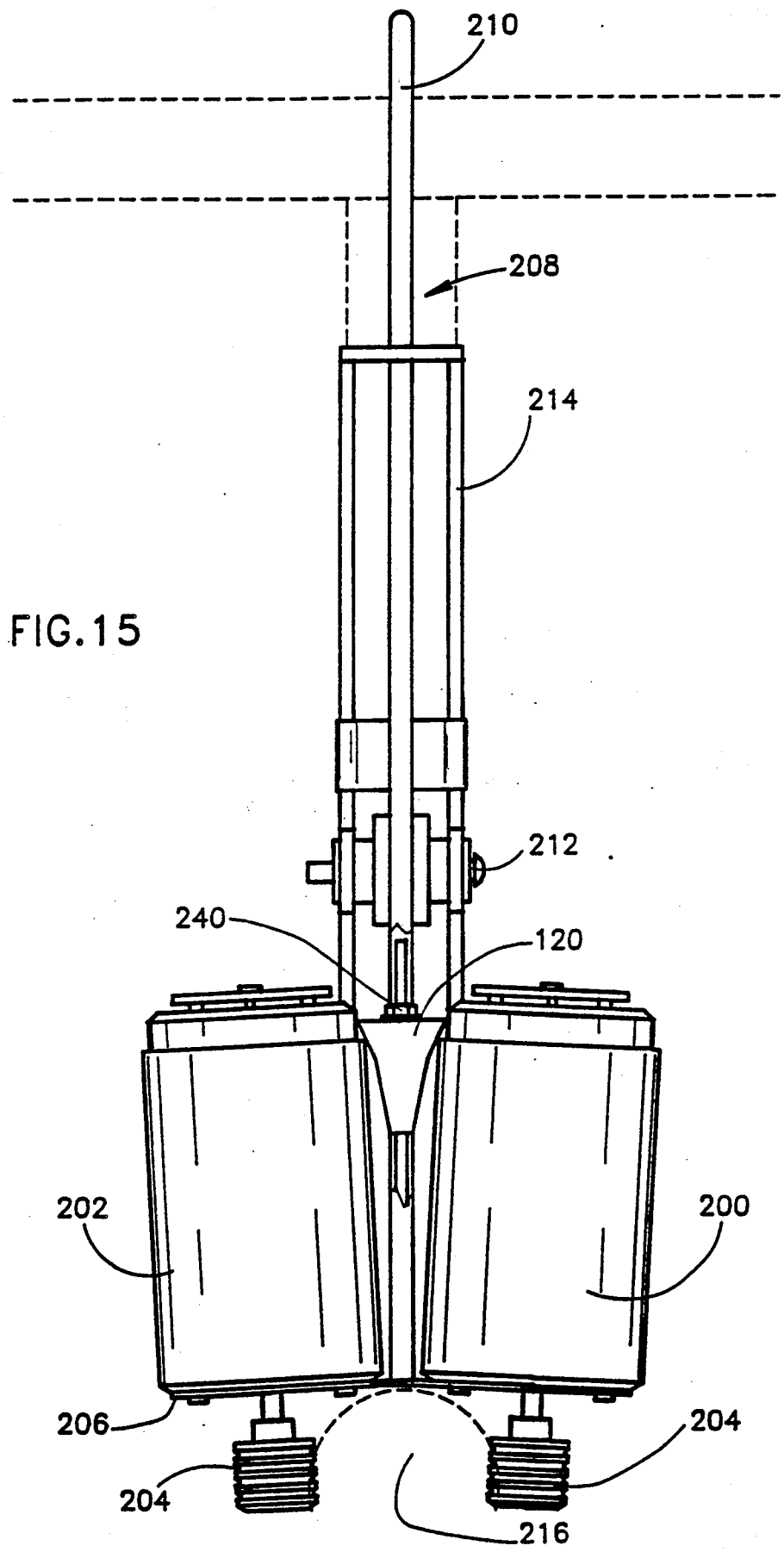
FIG. 15 is a front view illustration of the drive apparatus of FIG. 14 in a driving orientation.

In addition, selectably positionable wedge apparatus 120 is provided for selectable operative engagement with motors 200 and 202, thereby to enable selectable urging of rollers 204 against wheel 216, as illustrated in FIG. 15. Wedge apparatus 120 is selectably positionable and is mounted onto plate 206, as by a long screw and corresponding nut, indicated at reference numeral 240. It is noted from a consideration of FIG. 14 and FIG. 15 that operative engagement of wedge apparatus 120 with motors 200 and 202 produces flexure of support plate 206. Selectable operative engagement of wedge apparatus 120 is produced by adjustment of positioning screw and nut combination 240.

Figure 17:
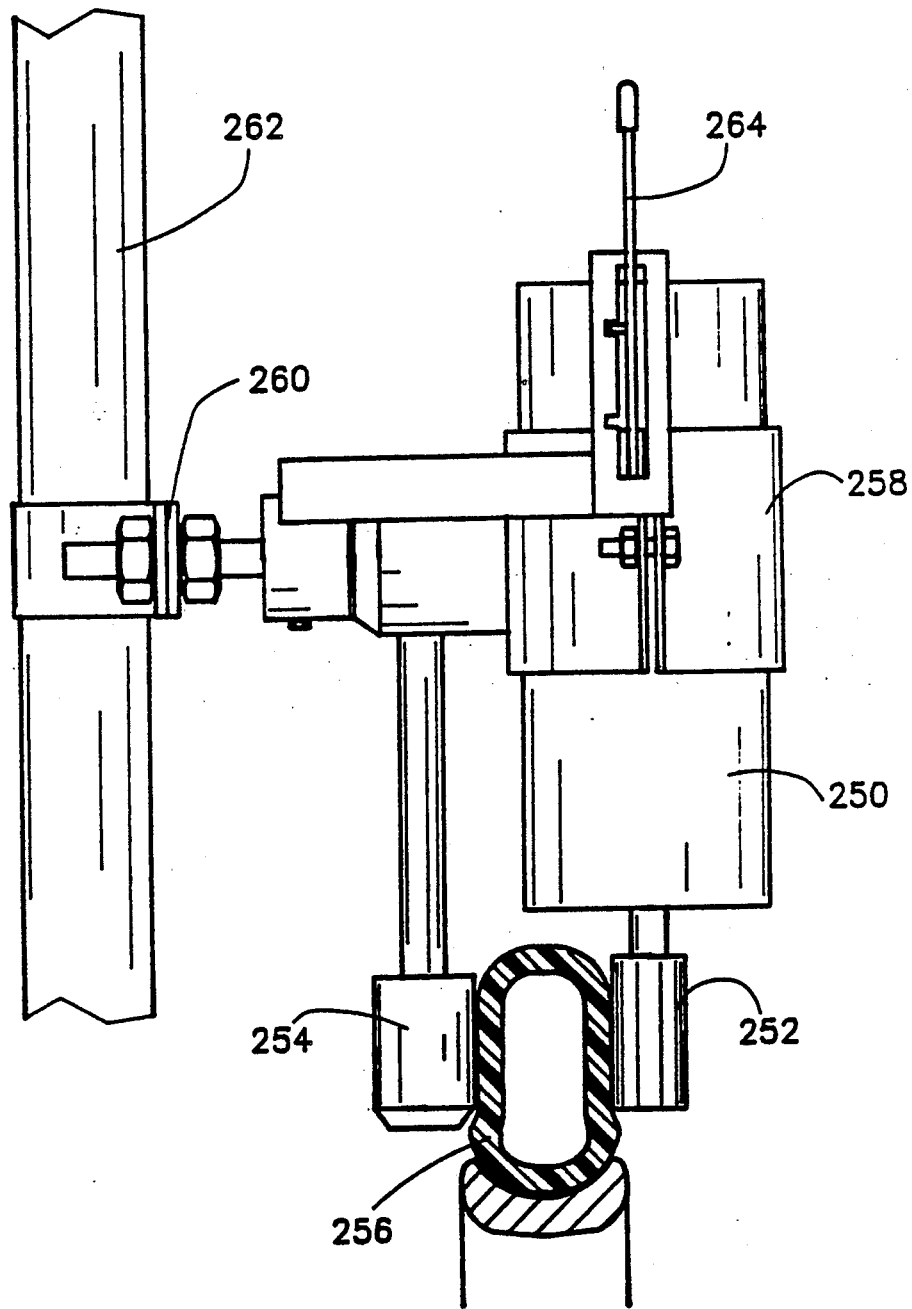
FIG. 17 is a top view illustration of auxiliary driving apparatus for a wheelchair constructed and operative in accordance with a preferred embodiment of the invention.
Figure 18A:
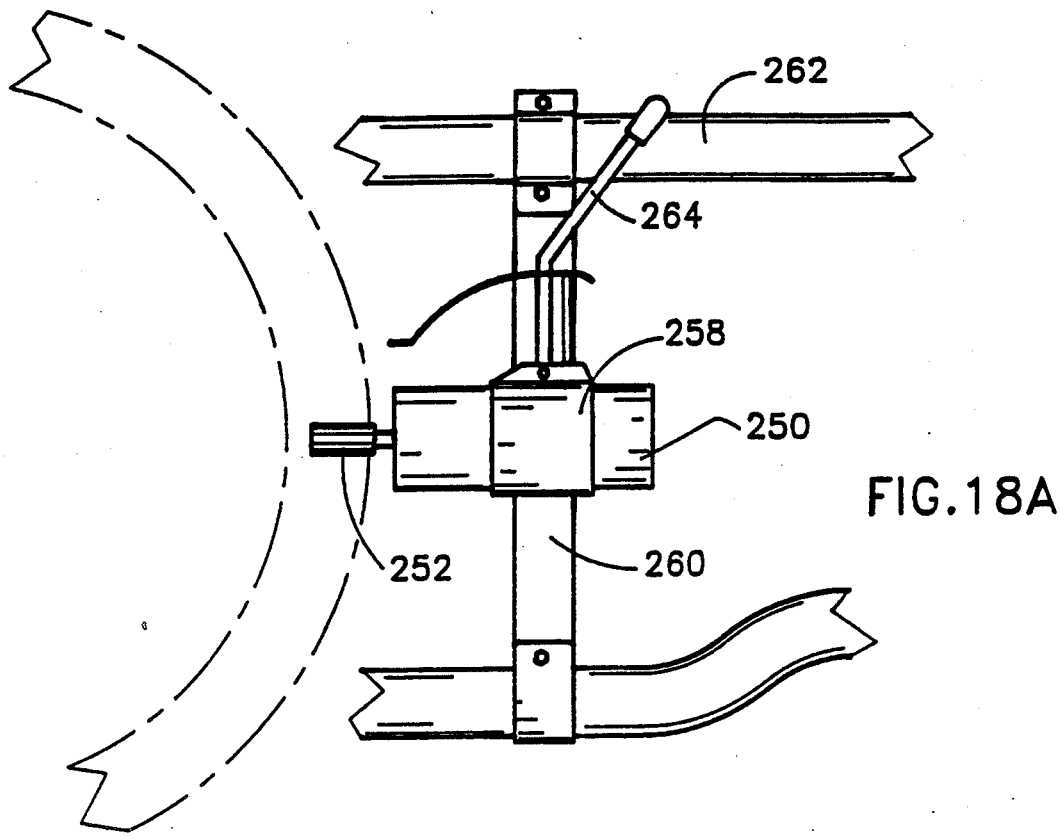
FIGS. 18A and 18B are side view illustrations of the apparatus of FIG. 17 in respective engaged and disengaged operative orientations.
Figure 18B:
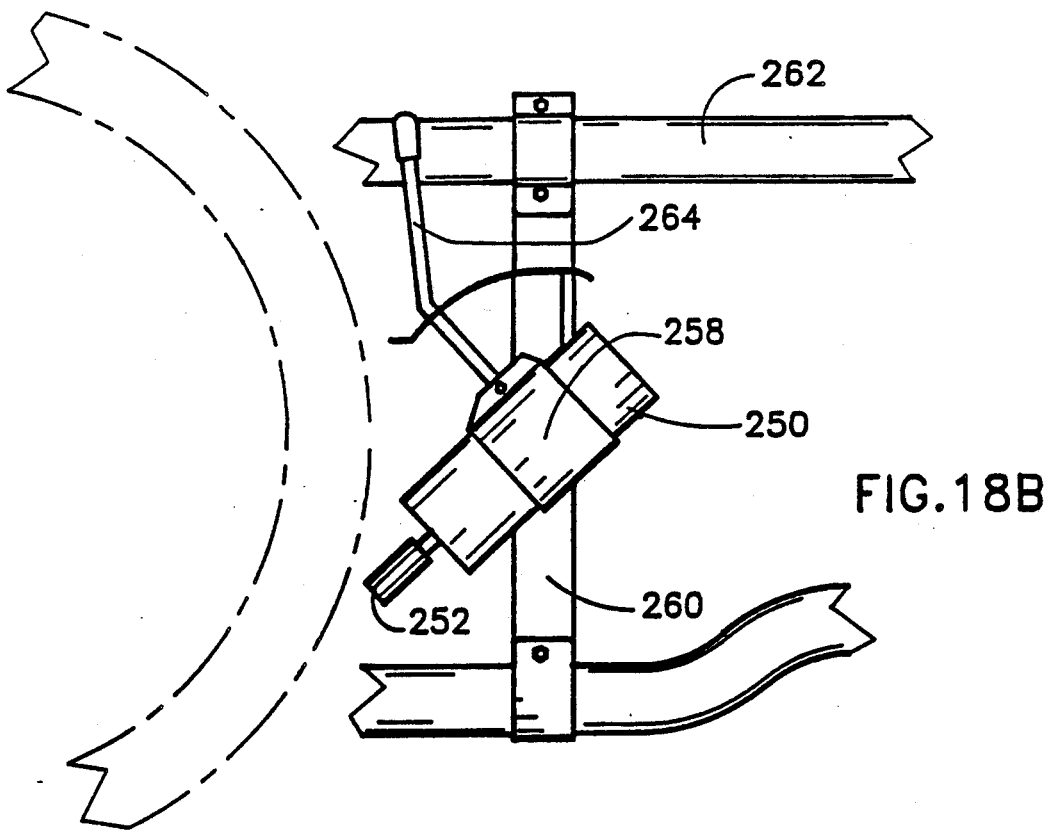

Reference is now made to FIGS. 17, 18A and 18B which illustrate auxiliary drive apparatus particularly suitable for use with a wheelchair. The drive apparatus comprises a motor 250 and associated drive roller 252 and a free-running platan roller 254, which are arranged to engage the tire 256 of a wheelchair.

The motor 250, drive roller 252 and platan roller 254 are pivotably mounted via a bracket 258 onto a support bracket 260, which is, in turn, mounted onto the wheelchair frame 262. A manually actuable handle 264, which is operable by the occupant of the wheelchair, is fixedly associated with the bracket 258.

It can be seen that the drive assembly, comprising motor 250, and rollers 252 and 254 can readily be rotated from a disengaged orientation, illustrated in FIG. 18B, to a driving orientation, illustrated in FIG. 18A, by a simple, hand-actuated movement.

It will be appreciated by persons skilled in the art that the present invention is not limited by what has been particularly shown and described hereinabove. Rather the scope of the present invention is defined only by the claims which follow:

I claim:

1. An electrically driven auxiliary drive for vehicles comprising:
   first and second electric motors each having associated therewith a friction drive element; and
   means for selectably bringing the friction drive elements into operative driving engagement with the tire of a vehicle wheel while the friction drive elements are maintained in fixed mutually spaced relationship.

2. An auxiliary drive for vehicles comprising:
   first and second electric motors each having associated therewith a friction drive element said friction drive elements being maintained in fixed mutually spaced relationship;
   means for selectably bringing the friction drive elements into operative driving engagement with a vehicle wheel having a rotation axis, for driving thereof including means for pivoting said first and second electric motors about an axis parallel to the rotation axis.

3. An auxiliary drive for vehicles comprising:
   first and second electric motors each having associated therewith a friction drive element said friction drive elements being maintained in fixed mutually spaced relationship;
   means for mounting the first and second electric motors about a single pivot axis,
   means for selectably pivoting the first and second electric motors about the single pivot axis, thus selectively bringing the friction drive elements into operative driving engagement with a vehicle wheel having a rotation axis parallel to the pivot axis for driving of the vehicle wheel, and wherein said means for mounting said first and second electric motors includes means for permitting limited motion of said first and second electric motors in a plane parallel to said pivot axis and said rotation axis thereby to enable said first and second motors to maintain driving engagement with the vehicle wheel notwithstanding eccentricities thereof.

4. An electrically driven auxiliary drive and regenerative braking system for vehicles comprising:

first and second electric motors each having associated therewith a friction drive element said friction drive elements being maintained in fixed mutually spaced relationship;

means for selectably bringing the friction drive elements into operative driving engagement with a vehicle wheel having a rotation axis for driving of the vehicle wheel in a driving mode of operation, by pivoting the friction drive about a pivot axis parallel to the rotation axis, and for being driven thereby in a regenerative braking mode of operation; and electrical energy storage means for supplying electrical power to the first and second electric motors during operation in the driving mode and for receiving electrical power from the first and second electric motors during operation in the regenerative braking mode of operation.

5. A system according to claim 4 and also comprising: electrical switching means for preventing overturning due to excessive braking.

6. An electrically driven auxiliary drive for vehicles comprising:

first and second electric motors each having associated therewith a friction drive element said friction drive elements being maintained in fixed mutually spaced relationship;

means for mounting the first and second electric motors and friction drive elements so as to permit limited motion thereof in fixed mutually spaced relationship in a plane;

means for selectably bringing said friction drive elements into operative driving engagement with a vehicle wheel for driving thereof, said vehicle wheel having a rotation axis extending parallel to said plane; and electrical energy storage means for supplying electrical power to the first and second electric motors, wherein the electrical energy storage means is readily removed from the auxiliary drive for recharging at a remote location.

7. Apparatus according to claim 6 and wherein said electrical energy storage means is integrally formed with means for permitting recharging thereof from mains power.

8. Apparatus according to claim 1 and wherein said first and second electric motors are pivotably mounted so as to selectably assume either a wheel engagement orientation or a disengaged orientation and wherein said means for selectively bringing said friction drive elements into operative driving engagement with a vehicle wheel comprises a spring loaded lever for determining the orientation of the first and second electric motors, said spring loaded lever being operative to normally maintain the first and second electric motors in a disengaged orientation, except when a predetermined force is applied to the lever.

9. Apparatus according to claim 1 and wherein said first and second electric motors are pivotably mounted so as to selectably assume either a wheel engagement orientation or a disengaged orientation and wherein said means for selectively bringing said friction drive elements into operative driving engagement with a vehicle wheel comprises a manually operated lever for determining the orientation of the first and second electric motors, said manually operated lever being operative to normally maintain the first and second electric motors in a disengaged orientation, except when a predetermined force is applied to the lever.

10. Apparatus according to claim 1 and wherein said first and second electric motors are pivotably mounted so as to selectably assume either a wheel engagement orientation or a disengaged orientation and wherein said means for selectively bringing said friction drive elements into operative driving engagement with a vehicle wheel comprises a motor operated lever for determining the orientation of the first and second electric motors, said motor operated lever being operative to normally maintain the first and second electric motors in a disengaged orientation, except when a predetermined force is applied to the lever.

11. An electrically driven auxiliary drive for vehicles comprising:

first and second friction drive elements, at least one of which having associated therewith an electric motor; and means for selectably bringing the wheel engagement elements into operative driving engagement with a vehicle wheel, while the friction drive elements are maintained in fixed mutually spaced relationship.

12. An auxiliary drive for vehicles comprising:

first and second friction drive elements, at least one of which having associated therewith an electric motor;

means for selectably bringing the wheel engagement elements into operative driving engagement with a vehicle wheel, while the friction drive elements are maintained in fixed mutually spaced relationship; and motor control apparatus for operating the electric motor including apparatus preventing motor operation when the wheel engagement elements are not in operative driving engagement with the vehicle wheel.

13. An auxiliary drive for vehicles comprising:

first and second wheel engagement elements, at least one of which having associated therewith an electric motor;

means for mounting the first and second wheel engagement elements about a single pivot point; and means for selectably pivoting the first and second wheel engagement elements together in fixed mutually spaced relationship, about the single pivot point, thus selectively bringing the wheel engagement elements into operative driving engagement with a vehicle wheel for driving thereof.

14. An electrically driven auxiliary drive and regenerative braking system for vehicles comprising:

first and second wheel engagement elements, at least one of which having associated therewith an electric motor;

means for selectably bringing the wheel engagement elements while they are maintained in fixed mutually spaced relationship into operative driving engagement with a vehicle wheel for driving thereof in a driving mode of operation, and for being driven thereby in a regenerative braking mode of operation, and electrical energy storage means for supplying electrical power to the electric motor during operation in the driving mode and for receiving electrical power from the electric motor during operation in the regenerative braking mode of operation.

15. A system according to claim 14 and also comprising:

electrical switching means for preventing overturning due to excessive braking.

16. An electrically driven auxiliary drive for vehicles comprising:

first and second wheel engagement elements, at least one of which having associated therewith an electric motor;

means for selectably bringing said wheel engagement elements, while they are in fixed mutually spaced relationship, into operative driving engagement with a vehicle wheel for driving thereof; and electrical energy storage means for supplying electrical power to the electric motor, wherein the electrical energy storage means is readily removed from the auxiliary drive for recharging at a remote location.

17. Apparatus according to claim 16 and wherein said electrical energy storage means is integrally formed with means for permitting recharging thereof from mains power.

18. Apparatus according to claim 11 and wherein said first and second wheel engagement elements are pivotably mounted so as to selectably assume either a wheel engagement orientation or a disengaged orientation and wherein said means for selectively bringing said friction drive elements into operative driving engagement with a vehicle wheel comprises a spring loaded lever for determining the orientation of the first and second wheel engagement elements, said spring loaded lever being operative to normally maintain the first and second wheel engagement elements in a disengaged orientation, except when a predetermined force is applied to the lever.

19. Apparatus according to claim 12 and wherein said first and second wheel engagement elements are pivotably mounted so as to selectably assume either a wheel engagement orientation or a disengaged orientation and wherein said means for selectively bringing said friction drive elements into operative driving engagement with a vehicle wheel comprises a manually operated lever for determining the orientation of the first and second wheel engagement elements, said manually operated lever being operative to normally maintain the first and second wheel engagement elements in a disengaged orientation, except when a predetermined force is applied to the lever.

20. Apparatus according to claim 11 and wherein said first and second electric motors are pivotably mounted so as to selectably assume either a wheel engagement orientation or a disengaged orientation and wherein said means for selectively bringing said friction drive elements into operative driving engagement with a vehicle wheel comprises a motor operated lever for determining the orientation of the first and second wheel engagement elements, said motor operated lever being operative to normally maintain the first and second wheel engagement elements in a disengaged orientation, except when a predetermined force is applied to the lever.

21. Apparatus according to claim 4 and also comprising a base member for receiving and supporting said electrical energy storage means, said base member being formed with electrical contacts arranged for immediate quick contact with corresponding contacts on the electrical energy storage apparatus when the electrical energy storage apparatus is positioned thereon.

22. Apparatus according to claim 1 and being associated with the front wheel of a bicycle.

23. Apparatus according to claim 1 and being associated with each of two rear wheels of a wheelchair.

24. Apparatus according to claim 1 and being associated with only one of the two rear wheels of a wheelchair.

25. A bicycle comprising a frame and front and rear wheels and auxiliary drive means according to claim 1

26. A wheelchair comprising a seat and at least two rear wheels and auxiliary drive means according to claim 1 associated with each of said at least two rear wheels.

27. A wheelchair comprising a seat and at least two rear wheels and auxiliary drive means according to claim 1 associated with only one of said at least two rear wheels.

28. Apparatus according to claim 1 and wherein said means for selectively bringing said friction drive elements into operative driving engagement with a vehicle wheel comprises means for maintaining a predetermined pressure engagement between the friction drive elements and the vehicle wheel.

29. Apparatus according to claim 4 and also comprising a front light and turn signals associated with the electrical energy storage apparatus and mounted thereon.

30. Apparatus according to claim 4 and also comprising means for providing hazard warning light operation.

31. Apparatus according to claim 4 and also comprising a DC electrical socket mounted on said electrical energy storage apparatus.

32. Apparatus according to claim 27 and also comprising means for manually rotating only one of the front wheels of the wheelchair, thereby to effect steering of the wheelchair.

33. Apparatus according to claim 32 and wherein the means for manually rotating is associated with a front wheel of the wheel chair located forward of the rear wheel of the wheelchair with which the auxiliary drive means are associated.

34. Apparatus according to claim 32 and also comprising means for governing the drive speed of the wheelchair which is mounted on said means for manually rotating.

35. Apparatus according to claim 1 and wherein said means for selectably bringing said friction drive elements into operative driving engagement with a vehicle wheel comprises means for pivotably mounting said first and second electric motors and friction drive elements, handle means fixedly mounted for pivotal movement with said first and second electric motors and friction drive elements and selectable handle retaining means for selectably retaining said handle in one of two selectable orientations, an operating orientation wherein said friction drive elements are in driving engagement with a vehicle wheel and a non-driving orientation wherein said friction drive elements are out of drive engagement with said vehicle wheel.

36. An electrically driven auxiliary drive for vehicles comprising:
first and second electric motors each having associated therewith a friction drive element, said friction drive elements being maintained in fixed mutually spaced relationship;
means for selectably bringing the friction drive elements into operative driving engagement with a vehicle wheel having a rotation axis for driving of the vehicle wheel in a driving mode of operation, by pivoting the friction drive about a pivot axis parallel to the rotation axis.

37. An electrically driven auxiliary drive for vehicles comprising:
first and second electric motors each having associated therewith a friction drive element, said friction drive elements being maintained in fixed mutually spaced relationship;
means for mounting the friction drive elements in operative driving engagement with a vehicle wheel having a rotation axis for driving of the vehicle wheel in a driving mode of operation, by pivoting the friction drive on a pivot axle and including means for selectable looking of the pivot axle with respect to the vehicle, whereby when the pivot axle is in a first rotational orientation translation of the pivot axle is prevented and when the pivot axle is in a second rotational orientation the pivot axle can be lifted, together with the first and second electric motors, out of engagement with the vehicle.

38. An electrically driven auxiliary drive for vehicles comprising:
first and second electric motors each having associated therewith a friction drive element;
means for selectably bringing the friction drive elements into operative driving engagement with a vehicle wheel having a rotation axis for driving of the vehicle wheel in a driving mode of operation; and
means for controlling the electric motors such that no driven rotational motion of the drive elements is provided when the vehicle wheel with which they are in engagement is stationary, thereby eliminating unnecessary wear and load on the drive elements, vehicle wheel and electric motors.

* * * * *